United States Patent
Fairfield et al.

(10) Patent No.: US 11,698,643 B2
(45) Date of Patent: *Jul. 11, 2023

(54) METHODS AND SYSTEMS FOR KEEPING REMOTE ASSISTANCE OPERATORS ALERT

(71) Applicant: Waymo LLC, Mountain View, CA (US)

(72) Inventors: Nathaniel Fairfield, Mountain View, CA (US); Joshua Herbach, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,108

(22) Filed: Jan. 7, 2022

(65) Prior Publication Data
US 2022/0129008 A1    Apr. 28, 2022

Related U.S. Application Data

(63) Continuation of application No. 16/931,135, filed on Jul. 16, 2020, now Pat. No. 11,269,354, which is a
(Continued)

(51) Int. Cl.
*G05D 1/02* (2020.01)
*G05D 1/00* (2006.01)
(Continued)

(52) U.S. Cl.
CPC ......... *G05D 1/0285* (2013.01); *B60W 30/182* (2013.01); *G05D 1/0016* (2013.01);
(Continued)

(58) Field of Classification Search
CPC .. G05D 1/0285; G05D 1/0016; G05D 1/0022; G05D 1/0038; G05D 1/0088;
(Continued)

(56) References Cited

U.S. PATENT DOCUMENTS 5,046,022 A    9/1991 Conway et al.
5,446,835 A    8/1995 Iida et al.
(Continued)

FOREIGN PATENT DOCUMENTS

WO    1996015481 A2    5/1996
WO    2014145471 A1    9/2014

OTHER PUBLICATIONS

Laput et al., "Zensors: Adaptive, Rapidly Deployable, Human-Intelligent Sensor Feeds".
(Continued)

*Primary Examiner* — Alan D Hutchinson
(74) *Attorney, Agent, or Firm* — McDonnell Boehnen Hulbert & Berghoff LLP

(57) ABSTRACT

Examples described may enable provision of remote assistance for an autonomous vehicle. An example method includes a computing system operating by default in a first mode and periodically transitioning from operation in the first mode to operation in a second mode. In the first mode, the system may receive environment data provided by the vehicle and representing object(s) having a detection confidence below a threshold, where the detection confidence is indicative of a likelihood of correct identification of the object(s), and responsive to the object(s) having a confidence below the threshold, provide remote assistance data comprising an instruction to control the vehicle and/or a correct identification of the object(s). In the second mode, the system may trigger user interface display of remote assistor alertness data based on pre-stored data related to an environment in which the pre-stored data was acquired, and receive a response relating to the alertness data.

20 Claims, 12 Drawing Sheets

Related U.S. Application Data continuation of application No. 15/683,386, filed on Aug. 22, 2017, now Pat. No. 10,761,542.

(60) Provisional application No. 62/531,093, filed on Jul. 11, 2017.

(51) Int. Cl.
*B60W 30/182* (2020.01)
*H04L 67/12* (2022.01)

(52) U.S. Cl.
CPC ......... *G05D 1/0022* (2013.01); *G05D 1/0038* (2013.01); *B60W 2554/00* (2020.02); *B60W 2556/65* (2020.02); *B60W 2900/00* (2013.01); *G05D 1/0088* (2013.01); *H04L 67/12* (2013.01)

(58) Field of Classification Search
CPC ......... G05D 2201/0213; G05D 1/0282; G05D 1/0027; B60W 30/182; B60W 2554/00; B60W 2556/65; B60W 2900/00; B60W 60/001; H04L 67/12; H04W 4/44
See application file for complete search history.

(56) References Cited

U.S. PATENT DOCUMENTS

| | | |
|---|---|---|
| 6,014,602 A | 1/2000 | Kithil et al. |
| 6,438,491 B1 | 8/2002 | Farmer |
| 6,832,251 B1 | 12/2004 | Gelvin et al. |
| 7,185,774 B2 | 3/2007 | Colgate et al. |
| 7,636,700 B2 | 12/2009 | Owechko et al. |
| 7,692,550 B2 | 4/2010 | Bonefas et al. |
| 7,692,551 B2 | 4/2010 | Bonefas et al. |
| 7,979,173 B2 | 7/2011 | Breed |
| 7,996,114 B2 | 8/2011 | Ban et al. |
| 8,121,729 B2 | 2/2012 | Blanc et al. |
| 8,195,394 B1 | 6/2012 | Zhu et al. |
| 8,311,858 B2 | 11/2012 | Everett et al. |
| 8,340,438 B2 | 12/2012 | Anderson |
| 8,467,597 B2 | 6/2013 | Monti et al. |
| 8,676,430 B1 | 3/2014 | Ferguson et al. |
| 8,766,819 B2 | 7/2014 | Dorfmann et al. |
| 8,794,181 B2 | 8/2014 | Bareket |
| 8,825,212 B2 | 9/2014 | Irie et al. |
| 8,909,415 B1 | 12/2014 | Hawley |
| 9,050,723 B1 | 6/2015 | Elazary et al. |
| 9,089,966 B2 | 7/2015 | Domae et al. |
| 9,089,971 B2 | 7/2015 | Aoba |
| 9,102,053 B2 | 8/2015 | Suzuki |
| 9,132,548 B2 | 9/2015 | Kamiya et al. |
| 9,156,162 B2 | 10/2015 | Suzuki et al. |
| 9,201,421 B1 | 12/2015 | Fairfield et al. |
| 9,238,304 B1 | 1/2016 | Bradski et al. |
| 9,283,680 B2 | 3/2016 | Yasuda et al. |
| 9,327,397 B1 | 5/2016 | Williams et al. |
| 9,606,539 B1 | 3/2017 | Kentley et al. |
| 10,416,671 B2 | 9/2019 | Herbach |
| 10,561,552 B2 | 2/2020 | Newkirk et al. |
| 2001/0052708 A1 | 12/2001 | Schmalz et al. |
| 2003/0046324 A1 | 3/2003 | Suzuki et al. |
| 2003/0088647 A1 | 5/2003 | ShamRao |
| 2003/0088781 A1 | 5/2003 | ShamRao |
| 2006/0148063 A1 | 7/2006 | Fauzzi et al. |
| 2008/0004749 A1 | 1/2008 | Hostettler |
| 2008/0177197 A1 | 7/2008 | Lee et al. |
| 2009/0088924 A1 | 4/2009 | Coffee et al. |
| 2010/0063663 A1 | 3/2010 | Tolstedt et al. |
| 2010/0256859 A1 | 10/2010 | Leyerle et al. |
| 2012/0075122 A1 | 3/2012 | Whitlow et al. |
| 2012/0239682 A1 | 9/2012 | Wedeniwski |
| 2012/0259462 A1 | 10/2012 | Aoba |
| 2013/0041508 A1 | 2/2013 | Hu et al. |
| 2013/0123980 A1 | 5/2013 | Seo |
| 2013/0211593 A1 | 8/2013 | Domae et al. |
| 2013/0253743 A1 | 9/2013 | Maruyama et al. |
| 2013/0290234 A1 | 10/2013 | Harris et al. |
| 2013/0345873 A1 | 12/2013 | Blumberg et al. |
| 2014/0025198 A1 | 1/2014 | Mattern et al. |
| 2014/0163730 A1 | 6/2014 | Mian |
| 2014/0277719 A1 | 9/2014 | Kamiya et al. |
| 2014/0365010 A1 | 12/2014 | Yasuda et al. |
| 2015/0032252 A1 | 1/2015 | Galluzzo et al. |
| 2015/0073589 A1 | 3/2015 | Khodl et al. |
| 2015/0120514 A1 | 4/2015 | Deshpande et al. |
| 2015/0148988 A1 | 5/2015 | Fleck |
| 2015/0248131 A1 | 9/2015 | Fairfield et al. |
| 2015/0314246 A1 | 11/2015 | Lehtonen et al. |
| 2015/0346718 A1 | 12/2015 | Stenneth |
| 2016/0129592 A1 | 5/2016 | Saboo et al. |
| 2016/0332567 A1 | 11/2016 | Wilson et al. |
| 2016/0334230 A1 | 11/2016 | Ross et al. |
| 2016/0370801 A1 | 12/2016 | Fairfield et al. |
| 2016/0380782 A1 | 12/2016 | Tanaka et al. |
| 2017/0090480 A1 | 3/2017 | Ho et al. |
| 2017/0192426 A1 | 7/2017 | Rust |
| 2017/0308100 A1 | 10/2017 | Iskrev et al. |
| 2018/0113457 A1 | 4/2018 | Iagnemma et al. |
| 2018/0113470 A1 | 4/2018 | Iagnemma et al. |
| 2018/0140957 A1 | 5/2018 | Woodcock |
| 2018/0196426 A1 | 7/2018 | Kim et al. |
| 2018/0224850 A1 | 8/2018 | Kroop et al. |
| 2018/0356814 A1 | 12/2018 | Brooks |
| 2019/0018411 A1 | 1/2019 | Herbach |
| 2019/0019349 A1 | 1/2019 | Dolgov et al. |
| 2019/0137287 A1 | 5/2019 | Pazhayampallil et al. |
| 2019/0163176 A1 | 5/2019 | Wang et al. |
| 2019/0186931 A1 | 6/2019 | Dittmer et al. |
| 2019/0197325 A1 | 6/2019 | Reiley et al. |
| 2019/0227553 A1 | 7/2019 | Kentley-Klay et al. |
| 2019/0286143 A1 | 9/2019 | Ross et al. |
| 2020/0084419 A1 | 3/2020 | Shimotsuma et al. |
| 2021/0031808 A1 | 2/2021 | Nakagawa et al. |

OTHER PUBLICATIONS

"Interactive Perception: From Scenes to Objects", Niklas Bergstrom, KTH Royal Institute of Technology, SE, 2012.

Savla, Ketan et al., "Human-in-the-loop Vehicle Routing Policies for Dynamis Environments," IEEE Conf. on Decision and Control, 2008, p. 1145-1150.

METHODS AND SYSTEMS FOR KEEPING REMOTE ASSISTANCE OPERATORS ALERT

CROSS-REFERENCE TO RELATED APPLICATIONS

The present disclosure is a continuation of U.S. application Ser. No. 16/931,135, filed on Jul. 16, 2020, which is a continuation of U.S. application Ser. No. 15/683,386, filed on Aug. 22, 2017, which claims priority to U.S. Provisional Application No. 62/531,093, filed on Jul. 11, 2017, the entire contents of which are herein incorporated by reference.

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by an autonomous vehicle system (i.e., any one or more computer systems that individually or collectively function to facilitate control of the autonomous vehicle). In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In one aspect, the present application describes a method of providing remote assistance for an autonomous vehicle. The method may involve operating, by a computing system, in one of two modes including a first mode and a second mode. Operating in one of two modes may comprise operation by default in the first mode and periodic transitioning from operation in the first mode to operation in the second mode. In the first mode, the computing system may (i) receive environment data provided by an autonomous vehicle operating in an environment, where the environment data represents at least one object of the environment having a detection confidence below a threshold, where the detection confidence is indicative of a likelihood that the at least one object is correctly identified in the environment, and (ii) in response to the at least one object having a detection confidence below the threshold, provide remote assistance data comprising one or more of (a) an instruction to control the autonomous vehicle and (b) a correct identification of the at least one object. In the second mode, the computing system may (i) trigger user interface display of remote assistor alertness data based on a set of pre-stored data related to an environment in which the pre-stored data was acquired, and (ii) receive a response relating to the remote assistor alertness data.

In another aspect, the present application describes a computing system. The computing system may comprise a processor, where the processor is configured for performing operations. The operations may comprise operating in one of two modes including a first mode and a second mode. In the first mode, the computing system may (i) receive environment data provided by an autonomous vehicle operating in an environment, where the environment data represents at least one object of the environment having a detection confidence below a threshold, where the detection confidence is indicative of a likelihood that the at least one object is correctly identified in the environment, and (ii) in response to the at least one object having a detection confidence below the threshold, provide remote assistance data comprising one or more of (a) ail instruction to control the autonomous vehicle and (b) a correct identification of the at least one object. In the second mode, the computing system may (i) trigger user interface display of remote assistor alertness data based on a set of pre-stored data related to an environment in which the pre-stored data was acquired, and (ii) receive a response relating to the remote assistor alertness data.

In still another aspect, the present application describes an article of manufacture including a non-transitory computer-readable medium having stored thereon instructions that, when executed by a processor in a computing system, causes the computing system to perform operations. The operations may comprise operating in one of two modes including a first mode and a second mode. In the first mode, the computing system may (i) receive environment data provided by an autonomous vehicle operating in an environment, where the environment data represents at least one object of the environment having a detection confidence below a threshold, where the detection confidence is indicative of a likelihood that the at least one object is correctly identified in the environment, and (ii) in response to the at least one object having a detection confidence below the threshold, provide remote assistance data comprising one or more of (a) an instruction to control the autonomous vehicle and (b) a correct identification of the at least one object. In the second mode, the computing system may (i) trigger user interface display of remote assistor alertness data based on a set of pre-stored data related to an environment in which the pre-stored data was acquired, and (ii) receive a response relating to the remote assistor alertness data.

In yet another aspect, a system is provided that includes a means for operating in one of two modes including a first mode and a second mode. In the first mode, the computing system may (i) receive environment data provided by an autonomous vehicle operating in an environment, where the environment data represents at least one object of the environment having a detection confidence below a threshold, where the detection confidence is indicative of a likelihood that the at least one object is correctly identified in the environment, and (ii) in response to the at least one object having a detection confidence below the threshold, provide remote assistance data comprising one or more of (a) an instruction to control the autonomous vehicle and (b) a correct identification of the at least one object. In the second mode, the computing system may (i) trigger user interface display of remote assistor alertness data based on a set of pre-stored data related to an environment in which the pre-stored data was acquired, and (ii) receive a response relating to the remote assistor alertness data.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
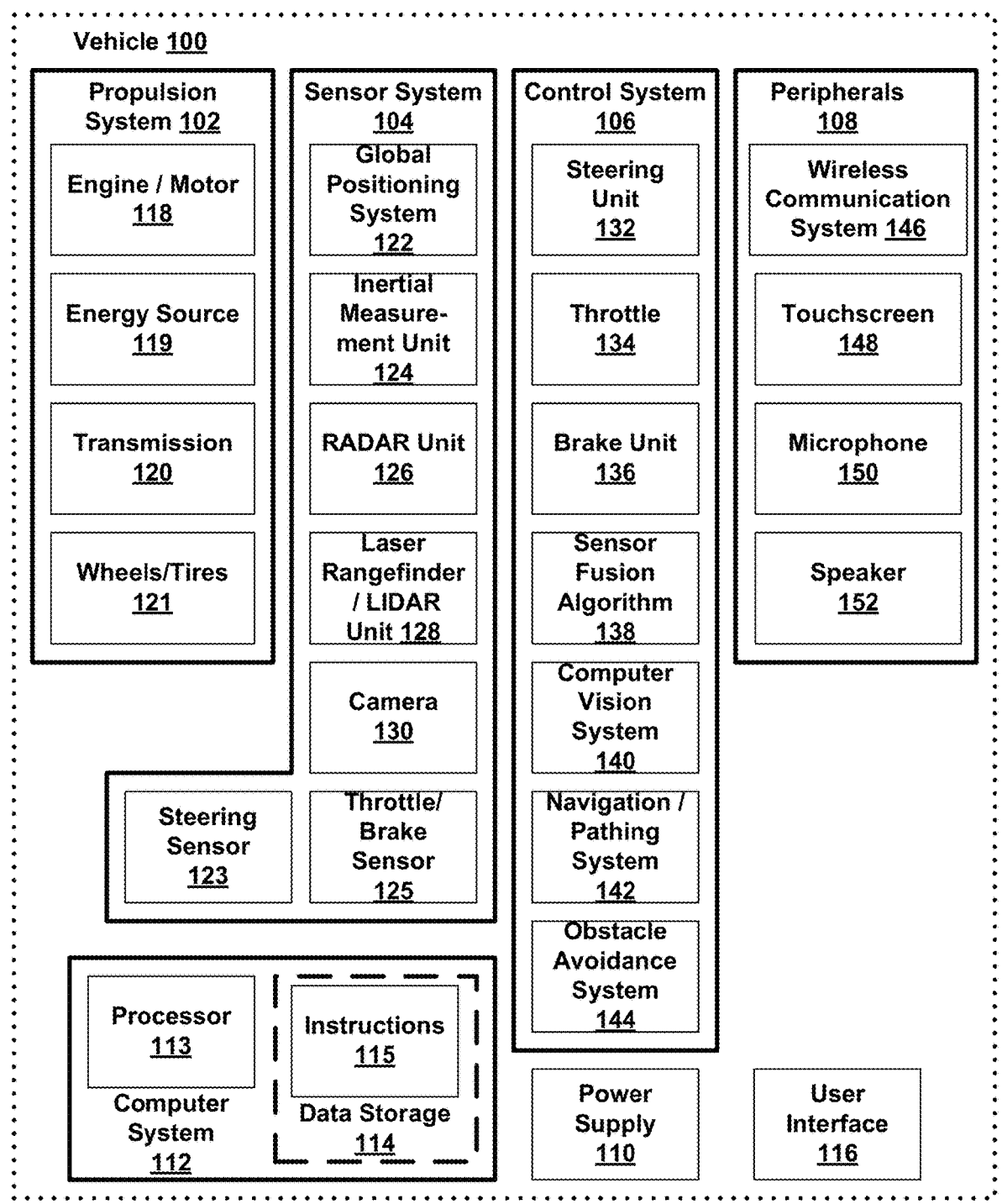
FIG. 1 is a functional block diagram illustrating a vehicle, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In practice, an autonomous vehicle system may use data representative of the vehicle's environment to identify an object. The vehicle system may then use the object's identification as a basis for performing another action, such as instructing the vehicle to act in a certain way. For instance, if the object is a stop sign, the vehicle system may instruct the vehicle to slow down and stop before the stop sign, or if the object is a pedestrian in the middle of the road, the vehicle system may instruct the vehicle to avoid the pedestrian.

In some scenarios, vehicle control technology may implement a remote assistance mechanism by which a human operator may work in conjunction with the vehicle system to help identify objects or otherwise assist the vehicle system with controlling the vehicle. For example, remote assistance may help to identify weather and/or hazardous conditions in which the vehicle is operating. Such a mechanism may include a remote computing system that is communicatively linked to the vehicle system, configured for remote assistance, and operated by the human operator. By way of this mechanism, the human operator's input may be taken into account in determining an object's identification, verifying the object's identification, and/or determining an instruction to control the vehicle.

In some implementations, a remote assistance process may be triggered in response to the vehicle system having identified an object with a detection confidence (i.e., an indication of the likelihood that the object has been correctly identified in the environment) that is below a predefined threshold. As an example of the remote assistance process the vehicle system may acquire (e.g., via cameras, LIDAR, radar, and/or other sensors) environment data including an object or objects in the vehicle's environment. The vehicle system may then determine that the detection confidence for the object is below the predefined threshold, and then send, to the remote computing system, the environment data that includes the object, such as in the form of an image of the object, a video of the object, and/or audio from the object. The human operator may provide an input to the remote computing system indicative of a correct identification of the object and/or an instruction to control the vehicle, which the remote computing system may in turn provide to the vehicle system in the form of remote assistance data for the vehicle system to use as a basis to control the vehicle.

In an example remote assistance scenario, the vehicle system may detect the presence of an object on the side of a narrow two-lane road, blocking one of the two lanes, and the object may not be an object that the vehicle system normally recognizes. For instance, the object may be a person near the side of the road that is directing traffic in an atypical manner e.g., so that oncoming traffic and outgoing traffic share the one open lane). When the vehicle encounters such an object in this scenario, the vehicle system may detect the existence of the object, but the vehicle may have a low confidence in detecting the object. For example, the vehicle system may be unsure whether the person is someone walking into the road, or, if the person is attempting to direct traffic, whether he or she is signaling the vehicle to drive or to stop. In such a scenario, the vehicle system could detect that this is likely an unusual event and send a camera image or video to a human operator who could analyze the situation, confirm what the person is doing, and confirm that the vehicle should stop and wait until it is their turn to proceed. This can help ensure safe operation of the vehicle in a scenario in which detection confidence is low.

The remote computing system may operate by default in a mode that supports remote assistance in the manner discussed above. At a minimum, the default mode of operation may involve receiving, from the vehicle system or an intermediary device, environment data representative of at least one object having a threshold low detection confidence (i.e., a detection confidence that is lower than a predefined threshold) and then, responsive to the at least one object having a threshold low detection confidence, providing remote assistance data to enable the vehicle system to control the vehicle with respect to the at least one object.

Mechanisms for remote assistance, such as the mechanism described above, may be optimal when a human operator is alert and unfatigued, and thus able to correctly and efficiently provide remote assistance. Consequently, it may be desirable for a remote assistance mechanism to also be configured to keep the human operator alert.

Accordingly, the present disclosure provides methods and systems for remote assistance in which the remote computing system is configured to operate in one of two modes including the default mode described above (also referred to herein as the "first mode"), and a remote assistance alertness mode (also referred to herein as the "second mode") in which the remote computing system (i) triggers a display of information (also referred to herein as "remote assistor alertness data" or "alertness data") to a human operator to keep the human operator alert and (ii) receives responses to the information. In particular, the remote computing system may be configured to operate in the first mode by default and to periodically transition from the first mode to instead operate in the second mode.

By way of example, the human operator may be periodically prompted with questions relating to images, sounds, and/or video recordings that were previously acquired by the vehicle's sensor system. For instance, if the vehicle previously recorded a sound and the vehicle system was not confident whether the sound was an ambulance siren or a part of a song playing on the vehicle's speakers, the human operator may be prompted with a question asking the human operator to identify whether the sound was a siren or a song. Within examples, the questions or other alertness data may relate to previous correct object identifications, such as objects that the vehicle system has correctly identified, or objects for which the human operator (or other human operator) has already provided assistance.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shall may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. MU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other implementations, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi™ or other possible connections. Wireless communication system 146 may also communicate directly with a device using an infrared link, Bluetooth®, or ZigBee®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system may represent a plurality of computing devices that may serve to control individual components or subsystems of vehicle 100 in a distributed fashion.

In some implementations, data storage 114 may contain instructions 115 (program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle TOO. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106, Depending upon the implementation, computer system 112 could be operable to monitor many aspects of vehicle 100 and its subsystems. In some implementations, computer system 112 may disable some or all functions of the vehicle 100 based on signals received from sensor system 104.

The components of vehicle 100 could be configured to work in an interconnected fashion with other components within or outside their respective systems. For instance, in an example implementation, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some implementations, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
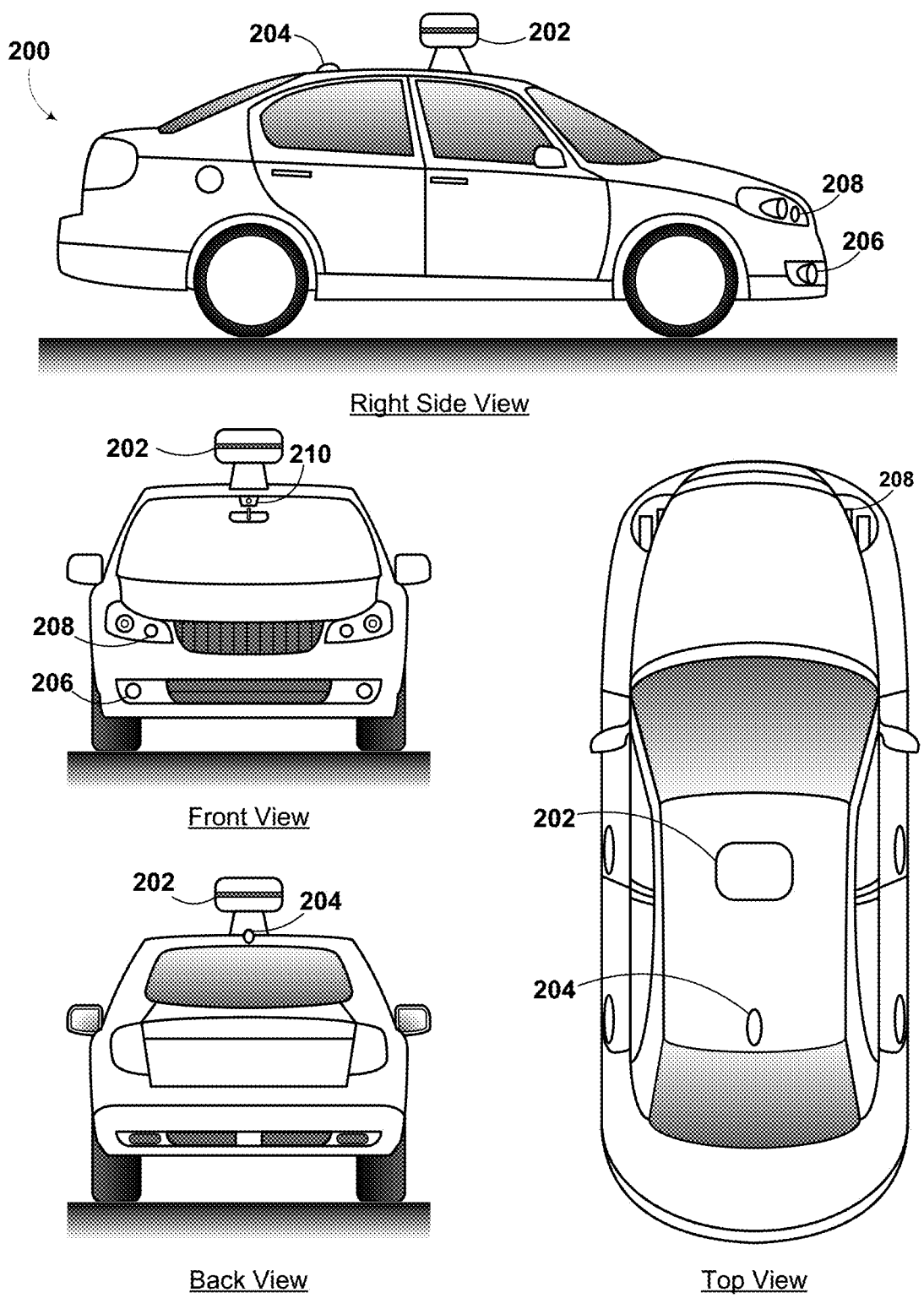
FIG. 2 is a conceptual illustration of a physical configuration of a vehicle, according to an example implementation.

FIG. 2 depicts an example physical configuration of vehicle 200, which may represent one possible physical configuration of vehicle 100 described in reference to FIG. 1. Depending on the implementation, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth® and/or 802.11), and acoustic sensors, among other possible types of sensors. In some implementations, sensor unit 202 may include one or more movable mounts operable to adjust the orientation of sensors in sensor unit 202, For example, the movable mount may include a rotating platform that can scan sensors so as to obtain information from each direction around the vehicle 200, The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFD), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3A:
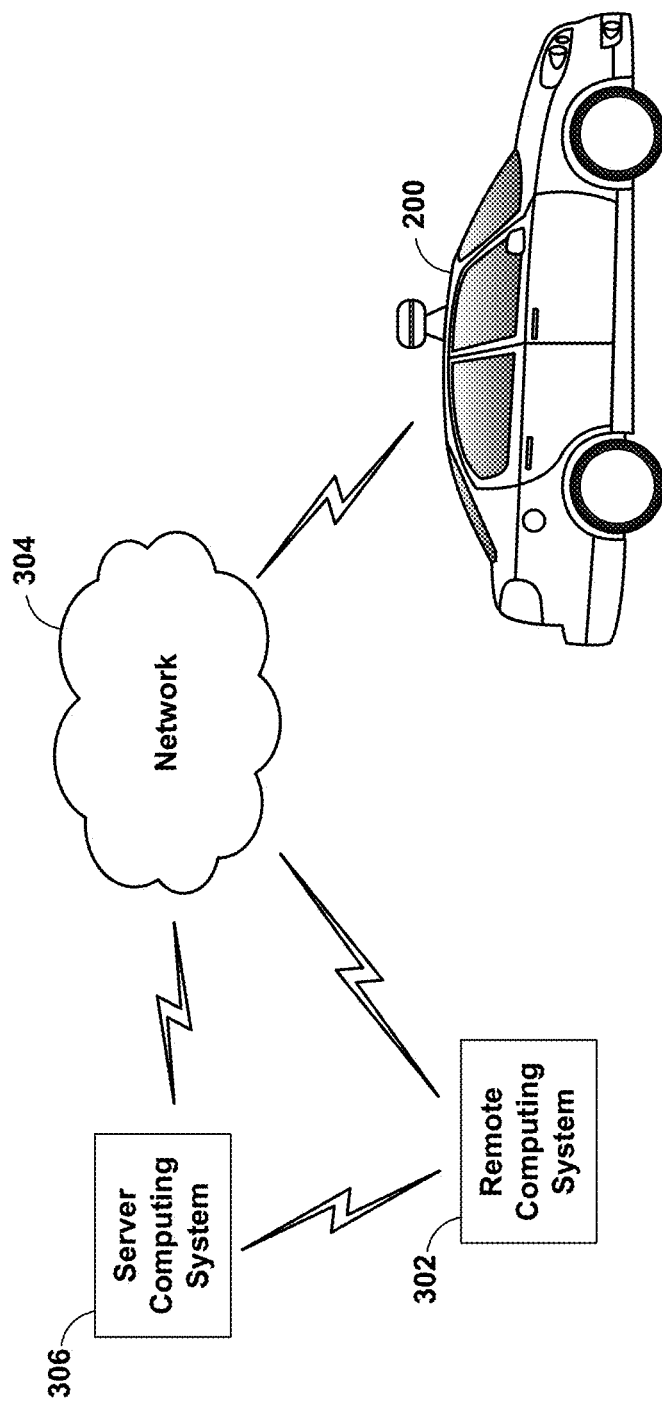
FIG. 3A is a conceptual illustration of wireless communication between various computing systems related to an autonomous vehicle, according to an example implementation.

FIG. 3A is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystems) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a remote computing system (e.g., remote computing system 302, or perhaps server computing system 306) may operate in one of two modes. The first of these modes may serve, in essence, as a means for a human operator (of the vehicle and/or the remote computing system) to provide remote assistance support for the vehicle, particularly in scenarios in which object detection confidence is low. The remote computing system may enable a human operator to provide this support in real-time or less frequently than real-time.

The second of these two modes may serve, at a minimum, as a means for keeping the human operator alert. The human operator may be a passenger or driver of the vehicle, or may be a third party located remotely from the vehicle but tasked with the responsibility of providing remote assistance to the vehicle (and possibly to other vehicles as well). Regardless of who the human operator is, it is desirable to keep the human operator alert so that the human operator can provide optimal remote assistance with minimal delay. For instance, there may be scenarios in which the vehicle may not have requested remote assistance in a certain amount of time (e.g., one hour), and therefore the human operator tasked with providing remote assistance to the vehicle may not have taken any remote assistance action in that amount of time, which may be long enough where the human operator may become fatigued or otherwise less attentive than desirable. In these and other types of possible scenarios, it may be desirable to periodically prompt the human operator during this time, via the remote computing system, with alertness data to keep the alert. The alertness data may take various forms, such as archived images, audio, or video having confirmed or unconfirmed object identifications, also including generated natural-language questions regarding the confirmed or unconfirmed object identifications.

More detail regarding the first mode and the second mode is provided below. It should be noted that operations relating to the first mode may apply to the second mode as well, and vice versa.

In some implementations, to facilitate remote assistance, including the first and/or second modes described herein, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar unit in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth® signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some implementations it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, and/or (iii) correct the identification if the identification was incorrect. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one implementation, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the environment data. In some implementations, the environment data may come from a camera and be image or video data. In other implementations, the environment data may come from a LIDAR unit. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, the vehicle and/or another computing entity may include as part of the environment data, a bounding box provided substantially around the object whose identification is at issue (e.g., image data with a box around the object). As such, when the remote computing system receives the environment data, the remote computing system may provide the environment data, including the object in the bounding box, for display to the human operator so that the human operator can readily and quickly identify the object in the environment data.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments. As a particular example, if the vehicle detects a sign that the vehicle identifies as a sign that reads "40 kilometers per hour," the vehicle may begin operating as if the identification is correct (e.g., adjust its speed to 40 kilometers per hour), even if the sign is detected as having a confidence below the confidence threshold. At the same time, or perhaps at a later time, the vehicle may also request remote assistance to confirm that the object is in fact a sign that reads "40 kilometers per hour."

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object. As a variation of the example above, if the vehicle detects a sign that the vehicle identifies as a sign that reads "40 kilometers per hour," and the sign is detected as having a confidence at or above the confidence threshold, the may begin operating in accordance with the detected object (e.g., adjust its speed to 40 kilometers per hour). At the same time, or perhaps at a later time, the vehicle may also request remote assistance to confirm that the object is in fact a sign that reads "40 kilometers per hour." The remote assistance in these other implementations may serve as a precaution or may serve other purposes. The vehicle may be configured to operate in this manner for certain types of objects, such as objects that are more important to vehicle and pedestrian safety (e.g., stop signs, traffic lights, crosswalks, and pedestrians).

In additional implementations, when the object is detected as having a confidence below the confidence threshold, the vehicle, server, or the remote computing system may generate a natural-language question based on the attempt to identify of the object, and then trigger the remote computing system to display, or otherwise present to the human operator, the natural-language question. For instance, if the remote computing system generates the question, it may responsively display the question as well. Whereas, if the vehicle or server generates the natural-language question, the vehicle or server may transmit a message to the remote computing system representative of the question, which upon receipt by the remote computing system may trigger the remote computing system to present the question to the human operator.

In some examples, the natural-language question may be, "Is this a stop sign?" In other examples, the natural-language question may take other forms such as, "Is this a construction sign?" Other various natural-language questions may be generated based on the detected object. The natural-language question may be based on a result of the object detection of the object. Additionally or alternatively, the natural-language question may be based on the preliminary identification of the object, so as to ask the human operator to confirm whether the preliminary identification is correct. In either case, the natural-language question may not include the correct identity of the object in some scenarios. For instance, if the vehicle has threshold low confidence that the object is a traffic signal with a green light, even though the object in reality is a traffic signal with a red light, the natural-language question may read "Is the light in this traffic signal green?" In yet some further examples, the object may be a misidentification based on roadside images. For example, a billboard may contain an image of a stop sign that the may be erroneously detected as a road-side stop sign. Other examples are possible as well.

At some point after receiving the environment data (or immediately upon receipt), the remote computing system may present the human operator with some or all of the environment data. The remote computing system may also provide the natural-language question. The remote computing system may present the environment data and/or the natural-language question in various ways. For example, the remote computing system may display, on a touchscreen, a graphical user interface (GUI) including captured images or video of the object. The GUI may also include the natural-language question and/or a bounding box associated with the object. Additionally or alternatively, the remote computing system may play, via a speaker of the remote computing system, an audio file representative of the natural-language question. In another example, the remote computing system may play, via the speaker, an audio file associated with the object (e.g., a siren sound from what may be an ambulance), and also present the natural-language question to the human operator via the speaker and/or the GUI. Other examples are possible as well.

To enable the human operator to provide input relating to the environment data, and thereby effectively respond to the request for remote assistance, the remote computing system may include an interface for receiving input, such as a keyboard, touchscreen, mouse, touchpad, microphone, etc.

In some implementations, the remote computing system may be configured to enable the human operator to provide an input indicating a correct identification by the vehicle, or perhaps an input indicating that the vehicle identified the object incorrectly. For example, the remote computing system may provide an image of a stop sign and a natural-language question that asks "Is this a stop sign?" The human operator may then input a response indicative of a "Yes" or "No" answer to that question based on his or her perception of the image.

Additionally or alternatively, in other implementations, the remote computing system may be configured to enable the human operator to provide an input representative of an instruction to control the vehicle. For example, if the human operator perceives the environment data to include an image of a stop sign and the natural-language question asks "Is this a stop sign?", the human operator may input an instruction to control the vehicle to stop at the stop sign (e.g., in scenarios where the vehicle has just recently detected the stop sign and is awaiting quick remote assistance feedback) or may input an instruction to control the vehicle to stop at the next stop sign that resembles the stop sign that is represented in the environment data. As another example, the remote computing system may provide the human operator with multiple options for instructing the vehicle. For instance, the remote computing system may display two GUI elements on a touchscreen representing options from which the human operator may choose: "Yes, this is a stop sign. Stop at the stop sign," or "No, this is not a stop sign. Do not stop." Other examples are possible as well.

In some implementations, the remote computing system may enable the human operator to perform other actions in order to correctly identify the object. For example, if the object at issue is an orange construction cone, the human operator may enter via a keyboard, or speak via a microphone, a response including the words "construction cone." This could occur in scenarios where no natural-language question is presented, but where the human operator may still correctly identify the object. As another example, if the object at issue is an orange construction cone, the human operator may browse the Internet on the remote computing system for another image of a construction cone and include the image in the human operator's remote assistance response. Other examples are possible as well.

At some point, the remote computing system may transmit, to the vehicle, remote assistance data that includes a representation of the human operator's feedback regarding the environment data, whether in the form of an instruction to control the vehicle, a correct identification of the object at issue, and/or some other form of feedback. The remote computing system may transmit the remote assistance data wirelessly or by some other manner.

Upon receipt of the remote assistance data by the vehicle, or perhaps sometime thereafter, the vehicle may control itself to operate in a manner that is in accordance with the remote assistance data. For example, the vehicle may alter its movement, such as by stopping the vehicle, switching the vehicle to a human-controlled mode, changing a velocity of vehicle (e.g., a speed and/or direction), and/or another movement alteration.

In some example scenarios, the remote assistance data may indicate the presence of an object that the vehicle was not aware of before seeking remote assistance (e.g., an object that the vehicle had not yet encountered). In other examples, the remote assistance data may indicate that the object is a different type of object than the vehicle had identified. In yet other examples, the remote assistance data may indicate that an object identified by the vehicle was not actually present in the environment (e.g., a false positive). In each of these examples, the remote assistance data provides information to the vehicle that has different objects than the autonomous vehicle determined. Therefore, to continue safe operation of the autonomous vehicle, the control of the vehicle may be altered.

Figure 3B:
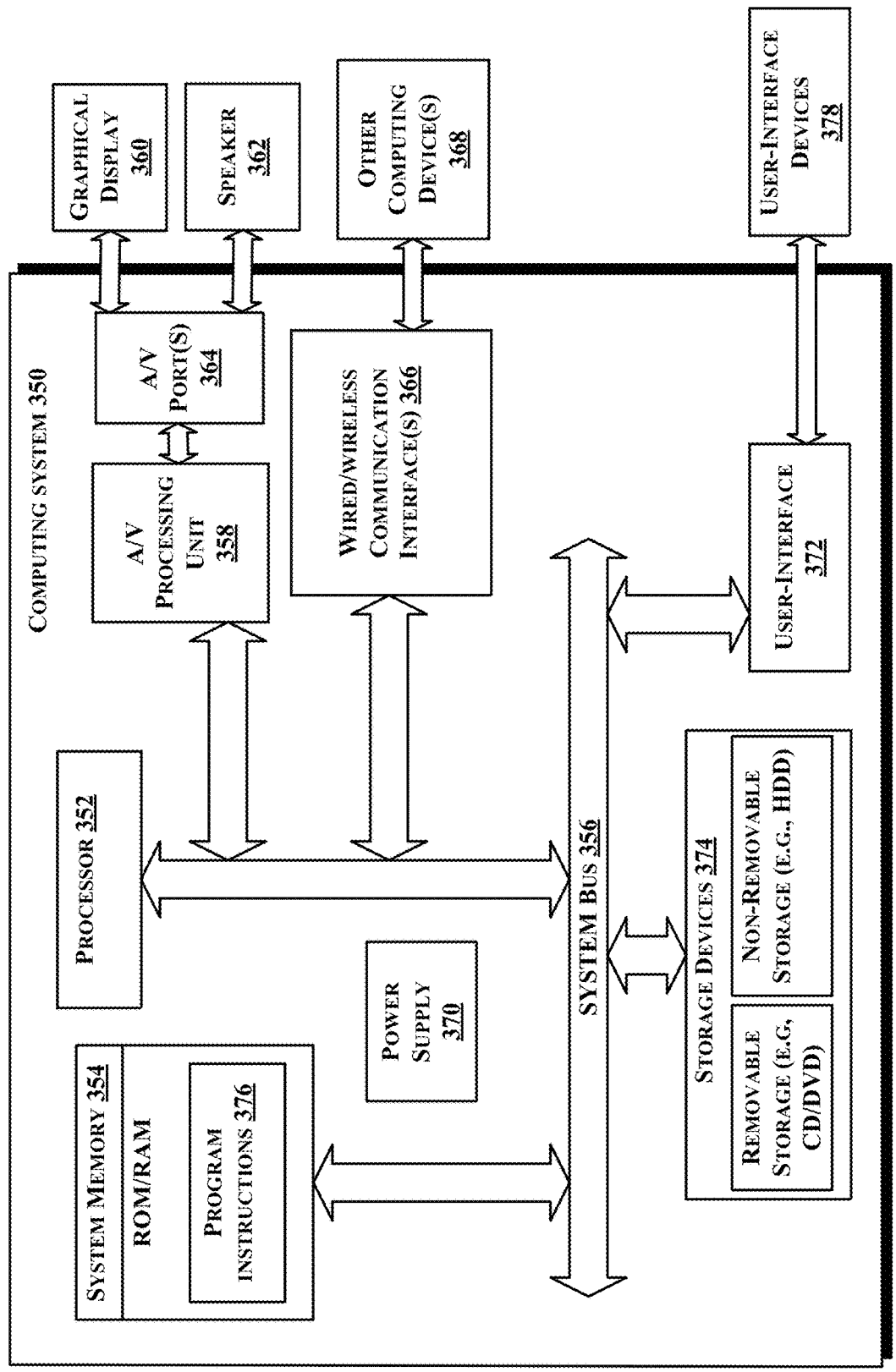
FIG. 3B shows a simplified block diagram depicting example components of an example computing system.

FIG. 3B shows a simplified block diagram depicting example components of an example computing system 350. One or both of the remote computing system 352, or perhaps server computing system 356, may take the form of computing system 350.

Computing system 350 may include at least one processor 352 and system memory 354. In an example embodiment, computing system 350 may include a system bus 356 that communicatively connects processor 352 and system memory 354, as well as other components of computing system 350. Depending on the desired configuration, processor 352 can be any type of processor including, but not limited to, a microprocessor (μP), a microcontroller (μC), a digital signal processor (DSP), or any combination thereof. Furthermore, system memory 354 can be of any type of memory now known or later developed including but not limited to volatile memory (such as RAM), non-volatile memory (such as ROM, flash memory, etc.) or any combination thereof.

An example computing system 350 may include various other components as well. For example, computing system 350 includes an A/V processing unit 358 for controlling graphical display 360 and speaker 362 (via A/V port 364), one or more communication interfaces 366 for connecting to other computing devices 368, and a power supply 370. Graphical display 360 may be arranged to provide a visual depiction of various input regions provided by user-interface module 362. For example, user-interface module 362 may be configured to provide a user-interface, and graphical display 360 may be configured to provide a visual depiction of the user-interface. User-interface module 362 may be further configured to receive data from and transmit data to (or be otherwise compatible with) one or more user-interface devices 368.

Furthermore, computing system 350 may also include one or more data storage devices 374, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium now known or later developed that can be used to store the desired information and which can be accessed by computing system 300.

Figure 6:
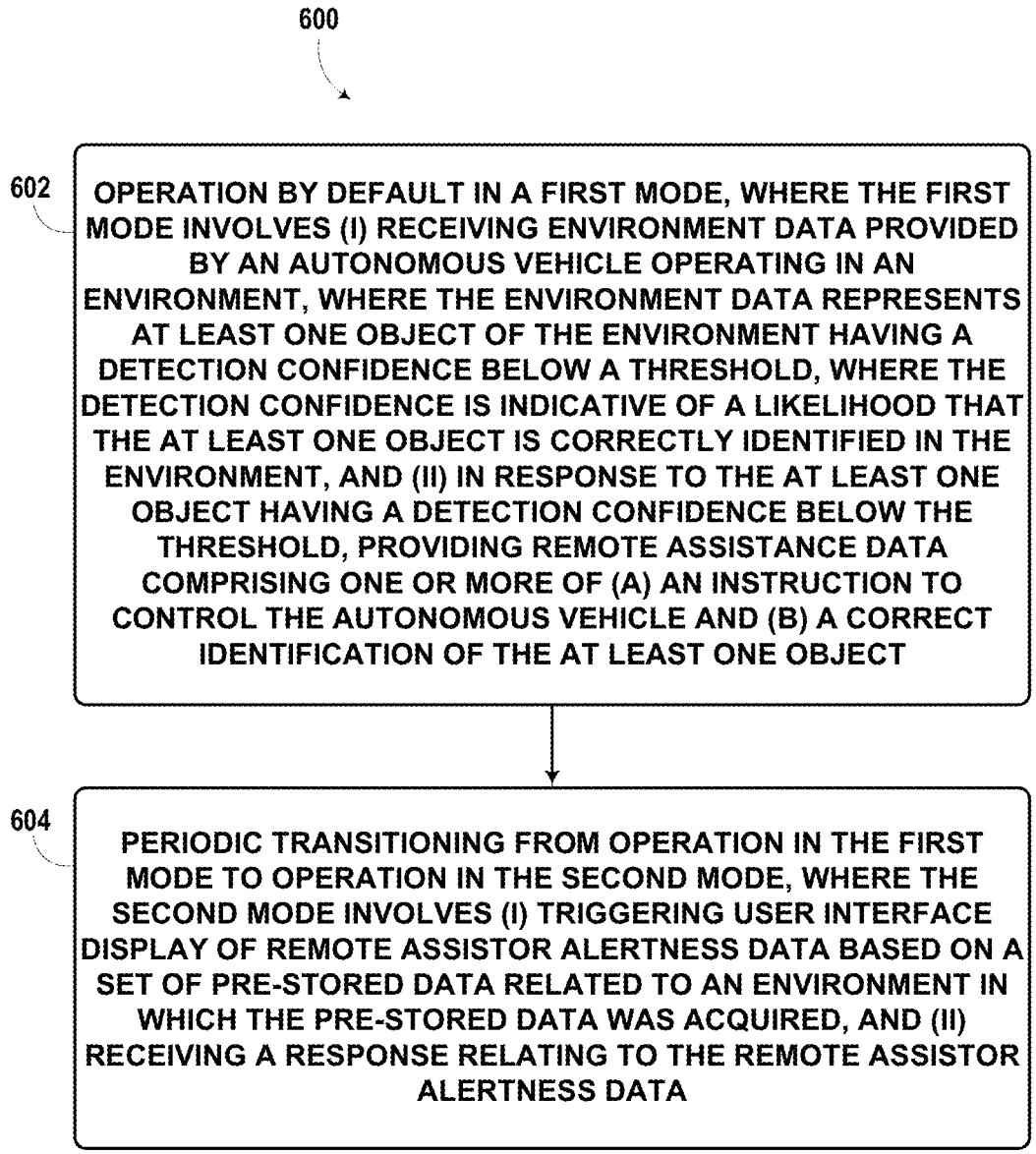
FIG. 6 is a flow chart of a method, according to an example implementation.

According to an example embodiment, computing system 350 may include program instructions 376 that are stored in system memory 354 (and/or possibly in another data-storage medium) and executable by processor 352 to facilitate the various functions described herein including, but not limited to, those functions described with respect to FIG. 6. Although various components of computing system 350 are shown as distributed components, it should be understood that any of such components may be physically integrated and/or distributed according to the desired configuration of the computing system.

Figure 4A:
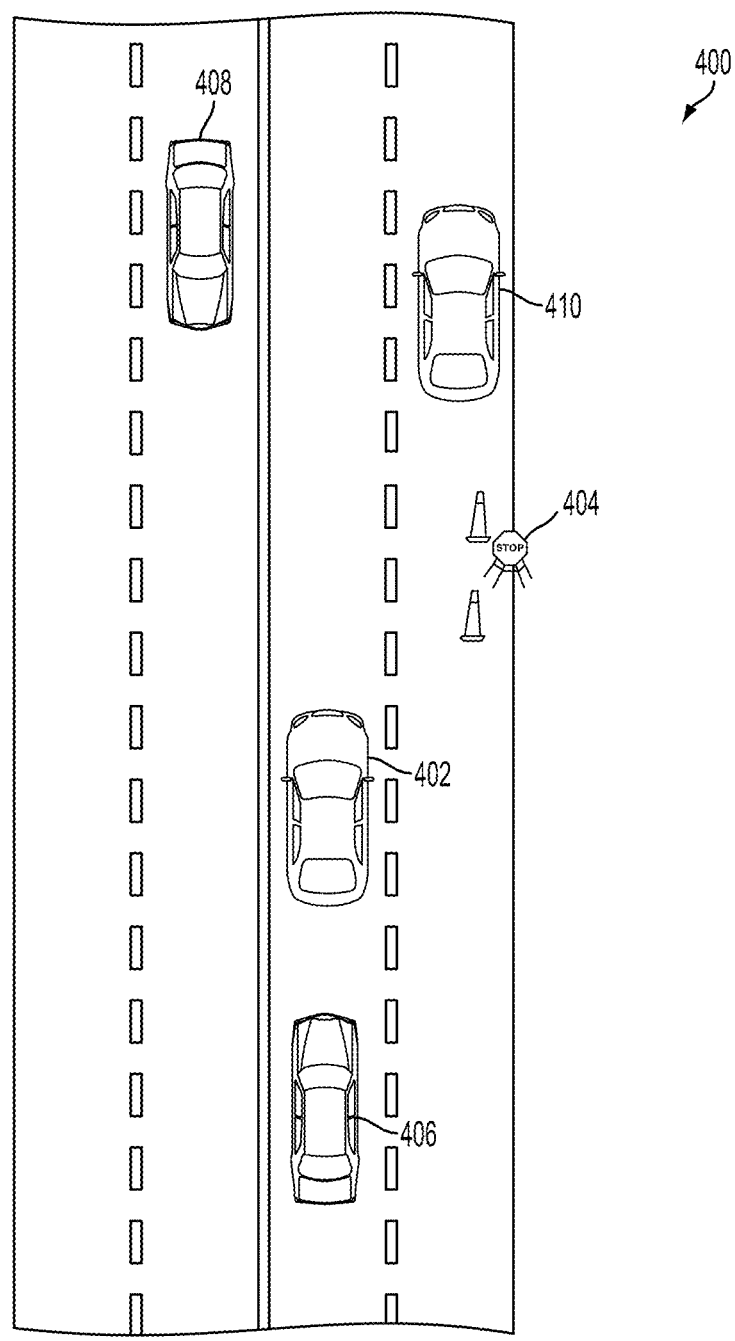
FIG. 4A illustrates a top view of an autonomous vehicle operating scenario, according to an example implementation.

FIG. 4A illustrates a top view of a scenario encountered by an autonomous vehicle, in accordance with an example implementation. As shown, an autonomous vehicle 402 may be operating within an environment 400 containing other vehicles 406, 408, and 410. The autonomous vehicle 402 may be operating in an autonomous mode with a lane of travel when it approaches an obstacle in the road, in this example a temporary stop sign 404.

Figure 4B:
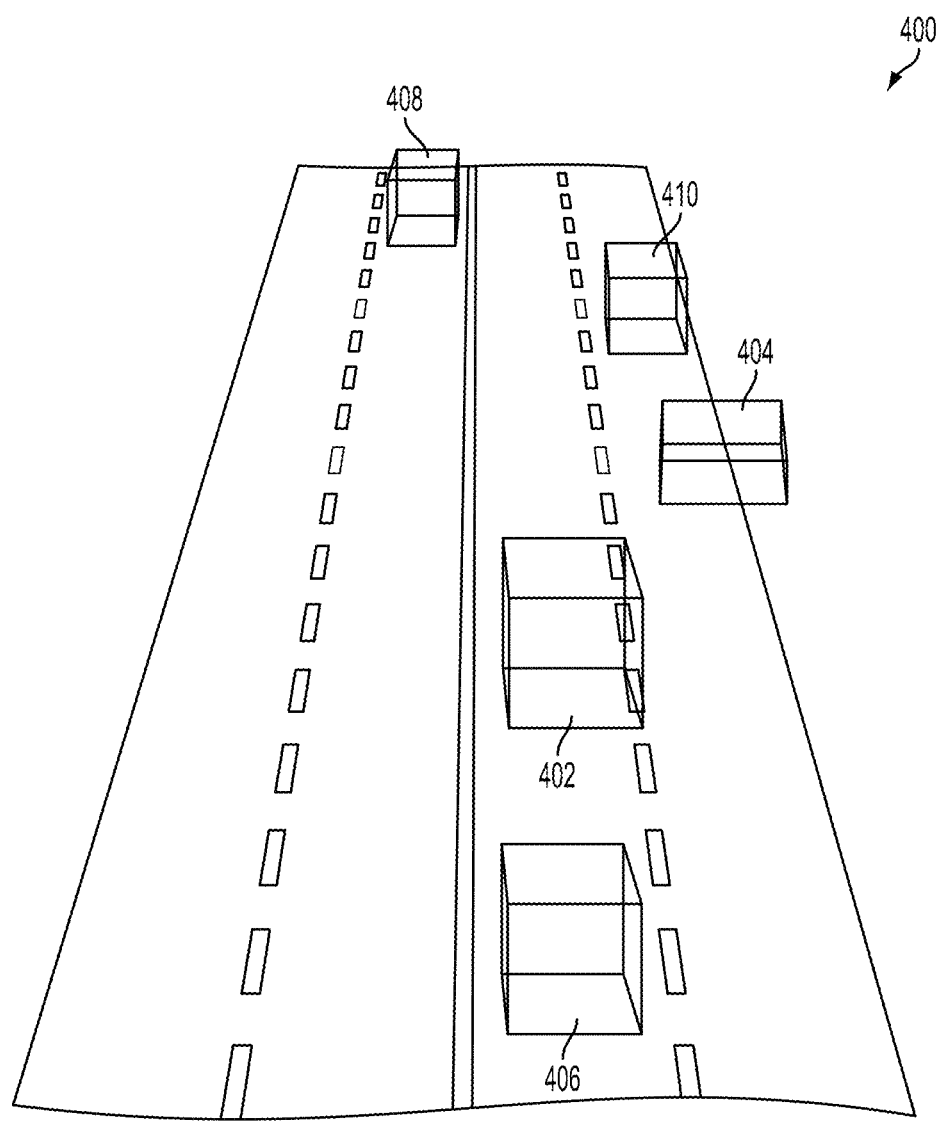
FIG. 4B illustrates a sensor data representation of the scenario from FIG. 4A, according to an example implementation.

The autonomous vehicle 402 may create a representation of its environment 400 based on any combination of possible types of sensor data as described above. FIG. 4B illustrates a representation of the environment from FIG. 4A based on sensor data collected by the vehicle, according to an example implementation. In some examples, the representation may not be a perfect copy of the environment. For instance, some of the sensors may be blocked in certain directions or some of the sensor data may be distorted. Additionally, some objects may be abstracted into geometric shapes, such as the representations of the vehicles 406, 408, and 410 or the temporary stop sign 404 shown in the figure. The autonomous vehicle 402 may identify objects or other aspects of the environment with varying levels of precision.

The situation depicted in FIG. 4A and FIG. 4B may be a situation in which the vehicle's confidence level drops below a predetermined threshold level. The drop in confidence level may be based on one or more different factors about the vehicle's operation and/or the vehicle's view of the environment. For example, the vehicle 402 may not be able to create a complete sensor representation of its environment because the temporary stop sign 404 may be obstructing its views of aspects of the environment (e.g., other cars). Additionally, the vehicle 402 may not be able to identify with confidence one or more objects within the environment, possibly including the temporary stop sign 404. Also, aspects of the vehicle's own operation may also cause its confidence level to drop. For instance, the vehicle may have stopped behind the temporary stop sign 404, and may have remained stuck there for a certain period of time, which may trigger a warning from one of the vehicle's systems. In some examples, if the vehicle 402 is stuck for more than a predetermined set amount of time (e.g., 1 minute or 5 minutes), its confidence level may begin to drop. Other factors may contribute to the vehicle's determination that its confidence in how to proceed (e.g., whether to continue waiting or to do something else) has fallen to a level where the vehicle should request remote assistance.

Figure 4C:
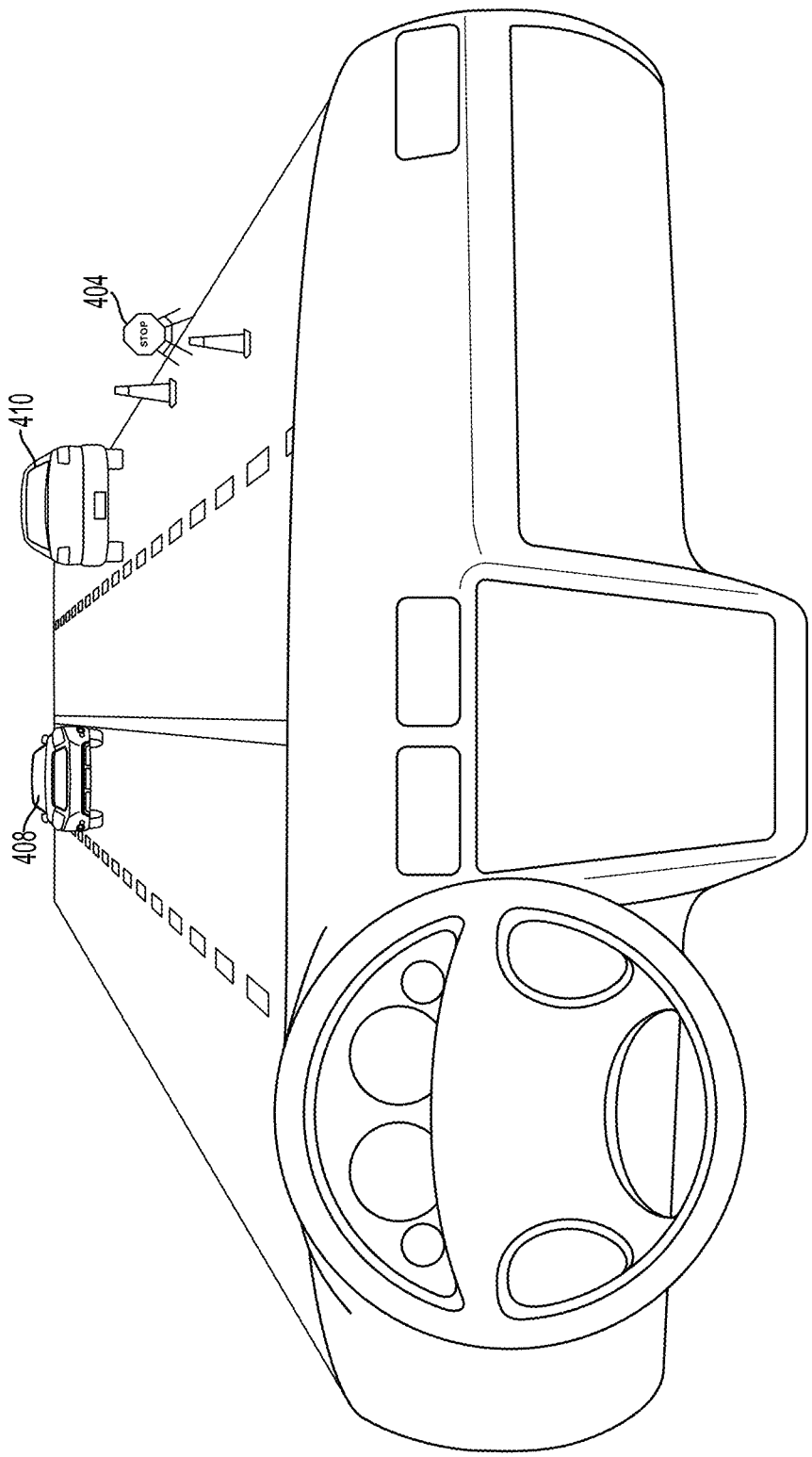
FIG. 4C illustrates a video feed taken from the vehicle in FIG. 4A, according to an example implementation.

FIG. 4C shows a video stream of the environment 400 of autonomous vehicle 402 from the point-of-view of the autonomous vehicle 402, For example, the autonomous vehicle 402 may be equipped with one or more video cameras which capture video streams of a portion of the environment 400. This environment data may be transmitted along with the request with assistance for use by the human operator. In this example, the portion of the environment 400 captured in the video stream includes the temporary stop sign 404 as well as parts of cars 408 and 410 that are not obstructed by the temporary stop sign 404. In some examples, the cameras may be moveable (and possibly may be controlled directly or indirectly by a remote operator) in order to capture video of additional portions of the environment 400 in order to resolve certain scenarios.

In further examples, the request for assistance may additionally include one or more suggested autonomous operations for the vehicle to take in the identified situation. For example, referring back to the scenario described with respect to FIG. 4, the vehicle may transmit options that may include holding position or attempting to pass the obstacle on the left. In one example, the vehicle may send a single suggested operation in order to receive verification of its proposed course of action, and may hold the vehicle's position until a response is received. In other examples, the vehicle may send a set of two or more proposed options for the human operator to select from. In some cases, the vehicle may not be able to propose a course of action. In such examples, the human guide may be able to propose a course of action for the vehicle to take, or a set of two or more possible courses of action.

In additional examples, the request for assistance may involve multiple parts. For example, the vehicle may ask a series of questions of the human operator in order to determine how to proceed with operation. For example, a user interface may include a natural-language question to aid in providing the input to the autonomous vehicle. For example, referring to the situation depicted in FIG. 4A, the vehicle 402 may first request assistance in order to identify the obstacle in the road as a temporary stop sign 404. The vehicle 402 may then make a second request in order to determine how best to proceed given that the obstacle has been identified as a temporary stop sign 404. Other more complicated discourses between the vehicle 402 and remote operator are possible as well.

Figure 4D:
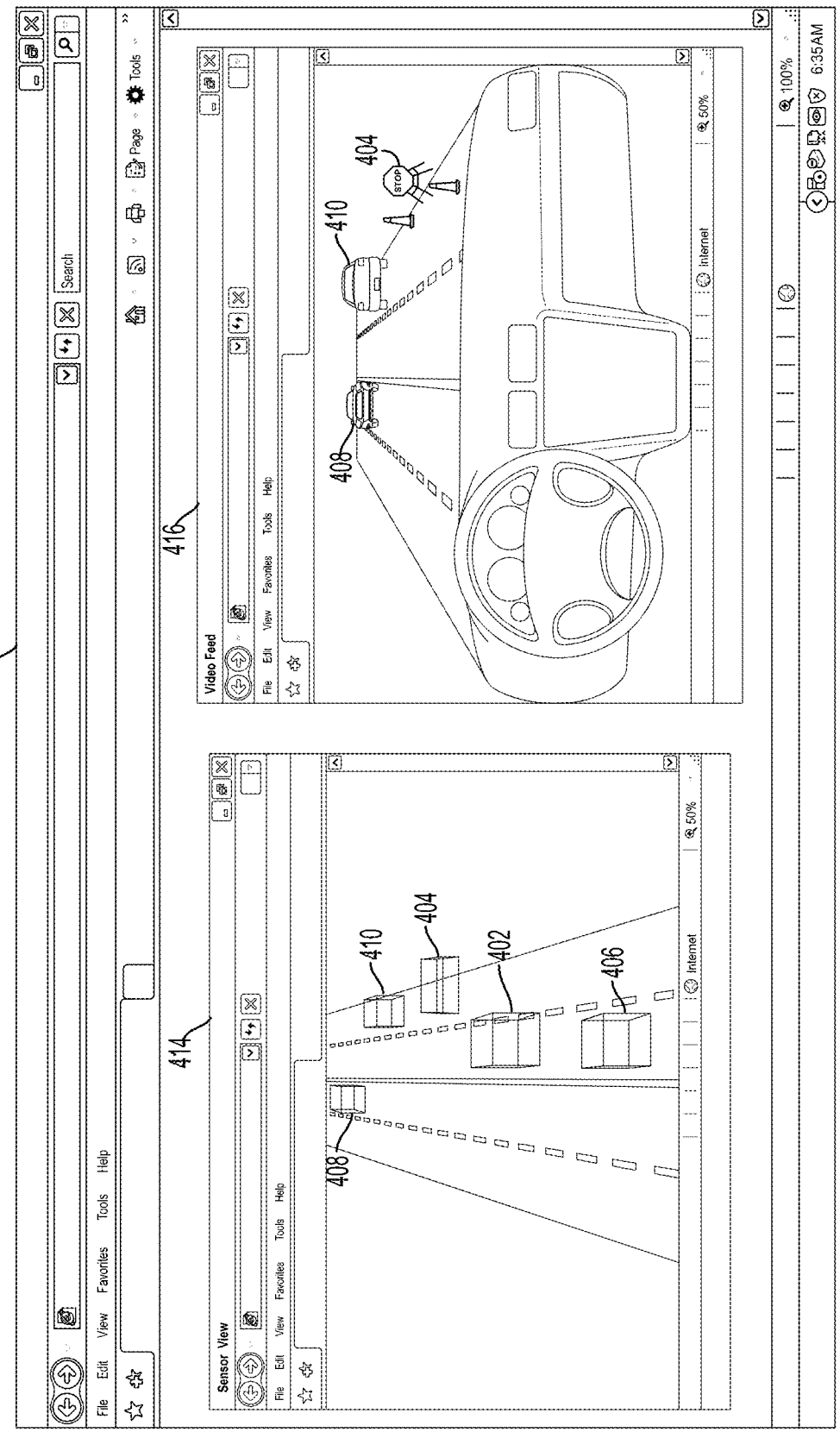
FIG. 4D illustrates a graphical user interface containing the sensor data representation from FIG. 4B and the video feed from FIG. 4C, according to an example implementation.

FIG. 4D shows an example GUI on a remote computing system that may be presented to a human operator. The GUI 412 may include separate sub-windows 414 and 416. The first sub-window 414 may include the vehicle's sensor data representation of its environment, such as described above with respect to FIG. 4B. The second sub-window 416 may include a video stream of a portion of the environment, such as described above with respect to FIG. 4C. Accordingly, the human operator may be able to compare the vehicle's understanding of its environment with the video stream to verify the vehicle's representation of its environment and/or to verify or suggest a planned course of action of the vehicle.

Figure 4E:
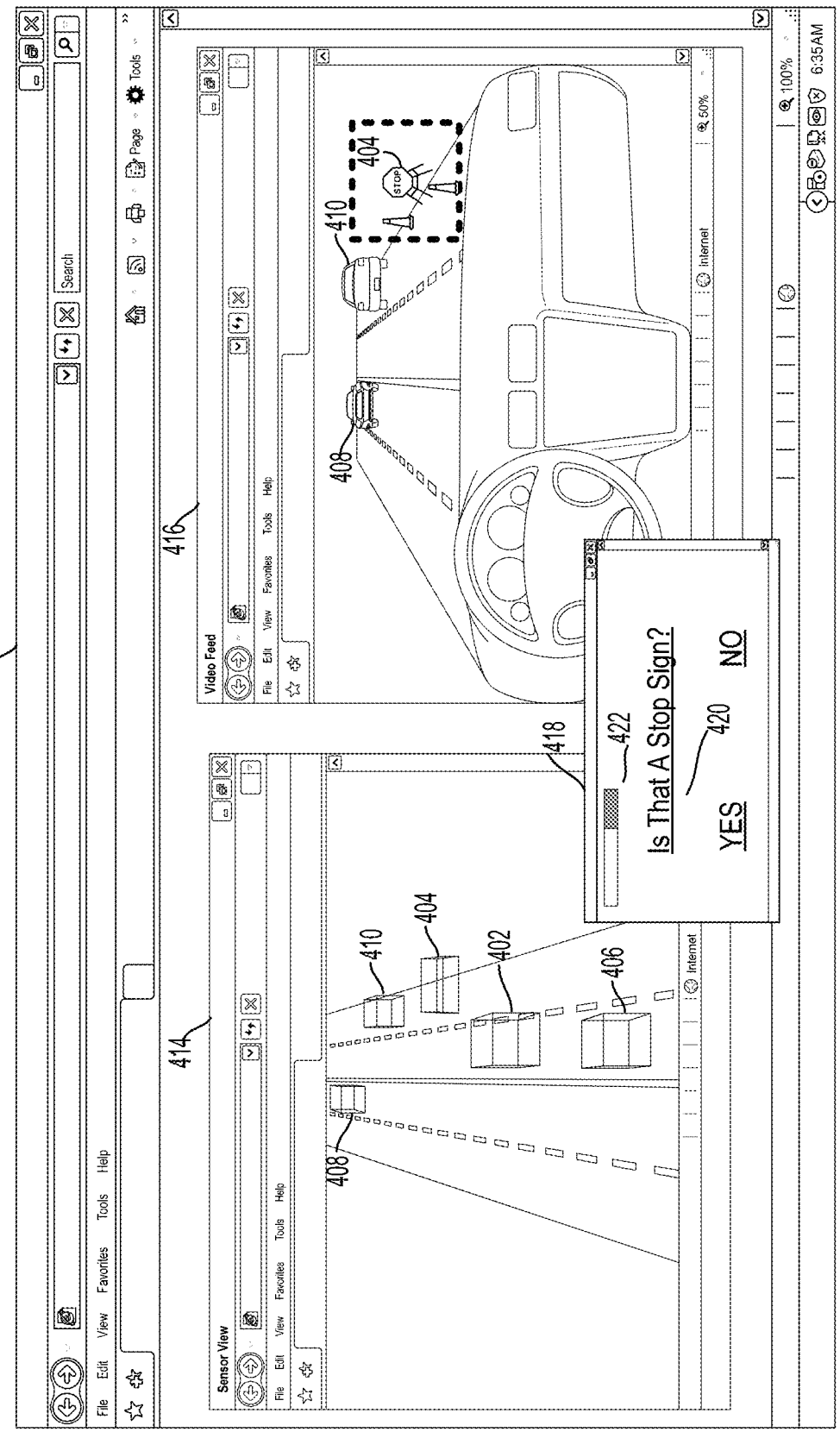
FIG. 4E illustrates the GUI from FIG. 4D including a control menu, according to an example implementation.

The human operator may be presented with a GUI that contains a control menu that enables a human operator to send a response to a vehicle indicating a proposed autonomous mode of operation. For example, FIG. 4E shows an example GUI that contains a first sub-window showing the vehicle's sensor data representation of its environment and a second sub-window showing a video stream of a portion of the vehicle's environment, such as described above with respect to FIG. 4D. FIG. 4E additionally contains a control menu 418 that may allow a human operator to respond to a natural-language question. Depending on the type of response provided to the vehicle, the control menu 418 may allow the operator to input guidance to the vehicle in a number of different ways (e.g., selecting from a list of operations, typing in a particular mode of operation, selecting a particular region of focus within an image of the environment, etc.).

In the example depicted in FIG. 4E, the human operator may indicate a natural-language question 420 to identify the object identified as the temporary stop sign 404. Additionally, when an identification is confirmed, the identification may be added to a global map. When the identification is added to the global map, other vehicles may not have to request an identification of the object in the future. The control menu 418 may additionally contain a latency Tar 422 indicating how old the received sensor data is, which may affect the human operator's response.

The response to the request for assistance may be received in a number of different ways. In implementations where the request for assistance was sent to a remote computing system not located within the vehicle, the response may be received wirelessly through a communication system located within the vehicle. In other implementations, such as those where the request for assistance was sent to a passenger located with the vehicle, the response may be received when the passenger enters an autonomous operation into a GUI of a computer system located within the vehicle. A passenger may be able to instruct the vehicle in other ways as well, such as through voice commands or through a handheld mobile device. Other modes of transmitting and/or receiving the request for assistance and/or the response to the request for assistance may also be used.

Figure 5:
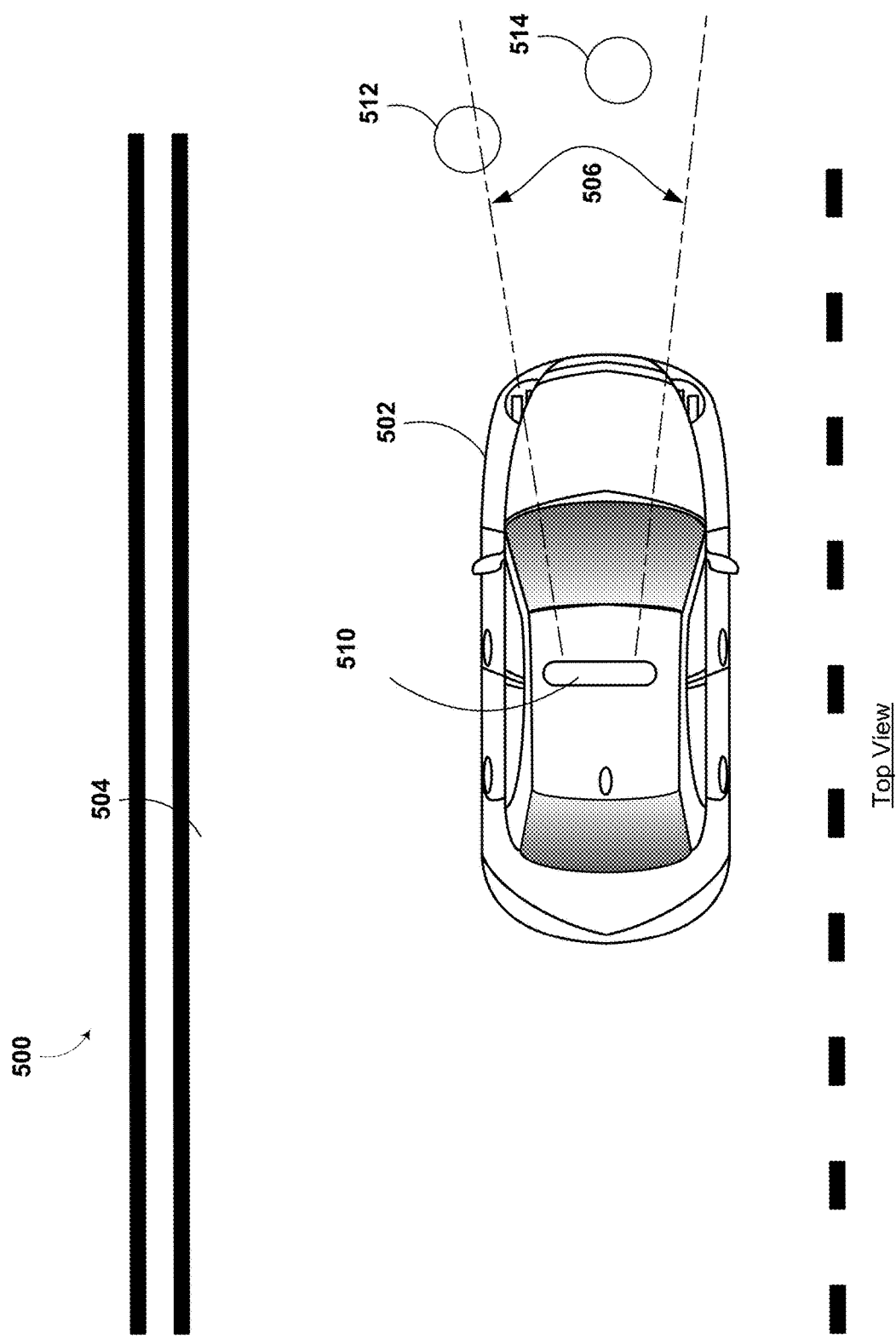
FIG. 5 is a top view of an autonomous vehicle during operation, according to an example implementation.

FIG. 5 illustrates an example scenario 500 involving a vehicle 502 traveling down a roadway 504. Vehicle 502 may be operating in an autonomous mode. Further, the vehicle 502 may be configured with a sensor unit 510. In one example, the sensor unit 510 may have a sensor, such as a camera, that has a field of view 506. The field of view 506 may correspond to a region of where the camera may be able to capture an image. In another implementation, sensor unit 510 may include a radar unit. The field of view 506 may correspond to a region over which the radar unit may send and receive signals. In other implementations, the field of view 506 may not be limited to a single region in front of the vehicle, but instead may correspond to the entire region (e.g., 360-degrees) around the vehicle. FIG. 5 illustrates an example scenario 500 in which the sensor unit uses a camera to obtain data about the environment of the vehicle. The description of FIG. 5 can also be used with other sensors, not just an optical sensor like a camera.

As one example implementation, as shown FIG. 5, there may be two environmental objects at least partially within the field of view 506 of a vehicle 502. In this example, it is assumed that the field of view 506 is that of an optical sensor, such as a camera. The camera of the sensor unit 510 may take a picture or video. This picture video will be analyzed to determine objects of the environment.

When the camera in the sensor unit 510 captures a video or image, a first object 514 may fall completely within the field of view 506. A second object 512 may only partially be located within the capture picture or video. When a processing system in the vehicle 502 analyzes the picture or video, it may be able to successfully identify an object, such as the first object 514. However, the processing system may not be able to successfully identify the second object 512 (or it may identify the object 512 with a low confidence), The processing system may not be able to successfully identify the second object 512 for many different reasons. In some implementations, the data of the environment may not include enough information to successfully identify the second object 512 automatically. For example, the second object 512 may be a street sign. An image captured by the vehicle may have a portion of the street sign cut off. The detection system of the vehicle may not be able to correctly identify the cut off street sign. In another example, an object may be partially obscured, so automatic identification may not work accurately. In still another implementation, an object may be deformed or damaged in such a way that the detection system of the vehicle may not be able to accurately detect the object.

Thus, the processing system may communicate data associated with the captured image or video for further processing. When a human operator views the resulting image or video, he or she may be able to successfully identify the second object 512, despite the object only partially being in the field of view 506. In other implementations, rather than communicating data to a human operator, the vehicle may communicate data to a more powerful computer system, which is remotely located, for further processing.

Although FIG. 5 is described with respect to pictures and video, the sensor unit 510 may have other sensors, which capture data that is not visible light. Therefore, the disclosed methods and apparatuses are not limited to just optical data collection. Additionally, the identification shown in FIG. 5 was described as having a misidentification due to the second object 512 only partially being within the field of view. In some implementations, a misidentification can occur even though the full object is located in an image or video.

FIG. 6 is a flow chart of a method for providing remote assistance for an autonomous vehicle, according to an example implementation. Method 600 represents an example method that may include one or more operations as depicted by one or more of blocks 602 and 604, each of which may be carried out by any of the systems shown in FIGS. 1-3B, among other possible systems. Each of the operators may also be carried out in accordance with the implementations described with regard to FIGS. 4A-E and FIG. 5. In an example implementation, a computing system such as remote computing system 302 performs the illustrated operations, although in other implementations, one or more other systems (e.g., server computing system 306) can perform some or all of the operations.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

In line with the discussion above, a computing system (e.g., remote computing system 302 or server computing system 306) may operate in one of two modes. As shown in FIG. 6, at block 602, the computing system operates by default in a first mode, where the first mode involves (i) receiving environment data provided by an autonomous vehicle operating in an environment, where the environment data represents at least one object of the environment having a detection confidence below a threshold, where the detection confidence is indicative of a likelihood that the at least one object is correctly identified in the environment, and (ii) in response to the at least one object having a detection confidence below the threshold, providing remote assistance data comprising one or more of (a) an instruction to control the autonomous vehicle and (b) a correct identification of the at least one object.

At block 604, the computing system periodically transitions from operation in the first mode to operation in the second mode, where the second mode involves (i) triggering user interface display of remote assistor alertness data based on a set of pre-stored data related to an environment in which the pre-stored data was acquired, and (ii) receiving a response relating to the remote assistor alertness data.

The second mode of operation may involve operations that are similar or identical to the operations discussed above. Such operations may include operations performed by the vehicle, computing system, and/or other entities. Furthermore, in some implementations, the first and second modes may be mutually exclusive, such that the computing system may not operate in both modes at the same time. In other implementations, however, the first and second modes may not be mutually exclusive. For instance, the computing system may enable the human operator to verify an unknown object identification at or around the same time as answering a natural-language question, or otherwise providing other information, regarding a known object.

In some implementations, the act of the computing system periodically transitioning from the operation in the first mode to the operation in the second mode may involve the computing system (i) determining that a period of time has expired since last providing remote assistance data, and (ii) in response to determining that the period of time has expired, transitioning from the operation in the first mode to the operation in the second mode. The period of time may be determined by the computing system, provided for use by the computing system by another computing system (e.g., the server), or predetermined and stored at the computing system.

In other implementations, the act of the computing system periodically transitioning from the operation in the first mode to the operation in the second mode may involve another computing system determining that a period of time has expired and responsively then instructing the computing system to transition to the second mode. For instance, the server may transmit, to the computing system, a message including data interpretable by the computing system as a command to transition to the second mode, and upon receipt of the message, the computing system may transition to operate in the second mode.

In some implementations, the computing system may be configured to provide remote assistor alertness data the human operator at fixed intervals (e.g., every 20 minutes). To facilitate this, the period of time may be the same for every transition from the first to the second mode.

In other implementations, some or all of the transitions from the first to the second mode may occur at random. To facilitate this, some (or each) period(s) of time that the computing system use(s) to determine when to transition to the second mode may be a random value selected from a range of values. For instance, some (or each) period(s) of time may have a random value in a range from 1 minute to 10 minutes, Other ranges are possible. The computing system may use various techniques for determining when to randomly transition to the second mode, such as by using a random number generator to determine the period of time.

In still other implementations, some or all of the transitions from the first to the second mode may occur at varying intervals. For instance, a second transition may occur 20 minutes after a first transition, but a third transition may then occur 10 minutes after the second transition. To facilitate this, the computing system may be configured to dynamically change the period of time.

In still other implementations, the computing system may transition to operate in the second mode based on a determination that there has been a threshold high amount of time that has passed since the vehicle transmitted a request for remote assistance. For example, if the computing system determines that over an hour has passed since the vehicle requested remote assistance, the computing system may responsively transition to operate in the second mode in order to provide the human operator with alertness data.

The computing system (or other computing entity) may determine a period of time based on various factors. As an example, the computing system may determine the period of time based on the time of day. For instance, the computing system may transition to operate in the second mode more frequently during the day, and more frequently during the night, or vice versa. In particular, the computing system may determine the period of time to be 10 minutes from 9:00 PM until 5:00 AM, such that the human operator is provided with alertness data every 10 minutes from 9:00 PM until 5:00 AM, but may determine the period of time to otherwise be 5 minutes. On the other hand, the human operator could be alerted more frequently at night, in order to keep the human operator alert or for other reasons.

As another example, the computing system may determine the period of time based on the occurrence of certain events, either known or unknown. For instance, the computing system may transition to operate in the second mode more frequently during rush hour (e.g., from 7:00 AM until 9:00 AM and/or from 5:00 PM until 7:00 PM). As yet another example, the computing system may determine the period of time based on environmental information that the vehicle detects or is otherwise informed of, such as the weather, road conditions, nearby construction, and/or nearby accidents. For instance, the computing system may transition to operate in the second mode more frequently when the vehicle is travelling in rain, snow, on wet roads, on icy roads, near the location of road construction, and/or near an accident that has recently been reported (or near an area that is known to have frequent accidents based on historical data). As yet another example, the computing system may determine the period of time based on a speed limit of the road on which the vehicle is travelling or is about to travel. For instance, the computing system may transition to operate in the second mode more frequently when the vehicle is travelling at higher speeds (e.g., over 64 kilometers per hour). In some examples, the computing system may determine the period of time based on local time where the vehicle is operating. However, in another example, the computing system may determine the period of time based upon the time at the computing system itself (i.e., the location of the operators).

In other examples, the computing system may determine the period of time based on the geographic area in which the vehicle is travelling or about to travel. For instance, the computing system may transition to operate in the second mode more frequently when the computing system (or another entity, such as the vehicle) determines that the vehicle is in a geographic area having population that exceeds a predefined threshold (e.g., New York City, Los Angeles). This may be advantageous because the vehicle may encounter and detect a large quantity of different types of pedestrians, signs, and/or other objects in such areas, or may be advantageous for other reasons.

As yet another example, the computing system may transition to operate in the second mode more frequently in scenarios where the computing system (or another computing entity) determines that a threshold high quantity of autonomous and/or non-autonomous vehicles (e.g., 60 vehicles) are within a predefined distance from the vehicle. For instance, the server may determine that there are more than the threshold quantity of vehicles near the vehicle (such as in a traffic scenario on a highway), and may responsively transmit a message to the computing system to inform the computing system, after which the computing system may then responsively determine the period of time to be 3 minutes until another event has occurred, such as a predetermined time expiring (e.g., the 30 minutes following the determination of the quantity of vehicles) or the quantity of vehicles falling below the threshold. As a further example, the computing system may transition to operate in the second mode more frequently in scenarios in which there is a human passenger in the vehicle. Yet further, in some examples, the computing system may transition to operate in the second mode more frequently based on the specific operator. For example, the performance of various operators may be measured. A respective time for each operator (or range of times) may be determined based on the operator's performance. In some examples, machine learning algorithms may be used to determine when to transition to the second mode for operators.

Conversely, there may be situations where the computing system may transition to operate in the second mode less frequently. These examples may include when the vehicle is in a trusted area (such as a maintenance area, refueling depot, testing area, etc.). Other factors may be used to determine when the computing system will transition to operate in the second mode and provide alertness data, in addition to or alternative to any one or more of the factors discussed above.

To facilitate operation in the second mode, the computing system may receive the pre-stored data at some point during operation in the first mode or the second mode. The act of the computing system receiving the pre-stored data may involve receiving the pre-stored data from the vehicle (e.g., vehicle 200) and/or from a server (server computing system 306). In implementations where the computing system is the server, the act of the computing system receiving the pre-stored data may involve receiving the pre-stored data from the vehicle or from another server.

The pre-stored data may include data that was stored as long as hours, days, or weeks in the past (e.g., with respect to the time when the pre-stored data is received by the computing system, or displayed). Additionally or alternatively, the pre-stored data may include data that was stored seconds or milliseconds in the past. For example, the pre-stored data may include an image of an object that is acquired by the vehicle and is then received and/or displayed milliseconds later by the computing system in substantially real-time. In this scenario, the vehicle may be requesting remote assistance in substantially real-time, which the computing system may use as a means for alerting the human operator via the second mode. As another example, the pre-stored data may include an image of an object that was acquired by the vehicle 24 hours before the pre-stored data is received and/or displayed by the computing system in accordance with the second mode. In this scenario, regardless of whether the object in the image is known to the vehicle by the time the image is displayed for the human operator, the image may be used to keep the human operator alert, so that the human operator must then verify the identification of the object. Other examples and scenarios are possible as well.

The pre-stored data may take various forms. For example, the pre-stored data may take the form of at least a portion of environment data that was previously acquired by the vehicle and was thereafter stored in memory at the vehicle and/or at the server. As such, the pre-stored data may include a video, an audio signal, and/or other data representations of an object in the vehicle's environment, such as any of those described above, including any of those that the computing system may receive while operating in the first mode. For example, the pre-stored data may include an image of a stop sign, a video of various other vehicles in the road, and/or an audio recording of an ambulance siren, among other possibilities.

The pre-stored data may also take the form of at least a portion of environment data that was previously acquired by any other vehicle that is communicatively linked to the computing system. In some implementations, the computing system may be directly associated with a set of one or more vehicles for which the human operator of the computing system provides (e.g., is authorized to provide) remote assistance, and thus the computing system may periodically provide the human operator with alertness data associated with one or more vehicles of the set. In other implementations, the computing system may receive pre-stored data and provide alertness data that is associated with one or more vehicles that are not included in the set.

As noted above, the computing system may trigger user interface display of alertness data based on the pre-stored data. In some instances, the computing system triggering user interface display of the alertness data may involve triggering user interface display of the pre-stored data along with the alertness data.

The alertness data may be generated in whole or in part by the computing system or other systems with which the computing system is communicatively linked. In scenarios where the computing system is a remote operator computing device operated by a human operator, for instance, the alertness data may be generated by the remote operator computing device, or may be generated by a server (or the vehicle) and then transmitted to the remote operator computing device. In scenarios where the computing system is a server, the server itself may generate the alertness data and then transmit the alertness data to a remote operator computing device, or may receive the alertness data generated by the vehicle and then transmit the alertness data to the remote operator computing device.

The alertness data may include any information related to the pre-stored data that may provide instructions or other help to the human operator, such as what the computing system is asking the human operator to do with the pre-stored data, what object(s) the vehicle alleges are represented in the pre-stored data, aid/or what time the vehicle acquired the pre-stored data (e.g., latency bar 422). In particular, the alertness data may take various forms, including but not limited to: at least one natural-language question, at least one statement related to the pre-stored data, a time stamp for the pre-stored data, a current location of the vehicle, a location of the vehicle when the vehicle captured the pre-stored data, a current speed of the vehicle, and/or a speed of the vehicle when the vehicle captured the pre-stored data. In line with the discussion above, the computing system or other computing entity may generate a natural-language question, statement, and/or any other alertness data information based on a result of the vehicle's object detection of the object, based on a preliminary identification of the object, and/or based on other factors.

In an example alertness data implementation, if the pre-stored data is an image of a stop sign, the alertness data may include the image, as well as a statement relating to the image, such as "Please confirm that there is a stop sign in this image." As another example, if the pre-stored data is an audio recording of what might be a police car siren, the alertness data may include the audio recording, as well as a natural language question asking "Is this the sound of a police siren?" (Or, the question may ask something like "Is this the sound of a dog or other animal?", which may occur if the vehicle has identified the police siren as an animal, regardless of whether the vehicle has done so with threshold high or low confidence.) Other examples are possible as well.

In some implementations, the alertness data may be associated with at least one object having a detection confidence below the threshold. In other words, the pre-stored data from which the alertness data is based may include an object that the vehicle could not identify with threshold high confidence.

Additionally or alternatively, in other implementations, the alertness data may be associated with at least one object that was previously and correctly identified. In other words, the pre-stored data from which the alertness data is based may include an object that is known by the vehicle, either as a result of a threshold high detection confidence by the vehicle or a correct remote assistance identification by a human operator. The alertness data in this implementation may also include a natural-language question requesting the human operator to confirm the object. By way of example, the alertness data may include pre-stored data of an image of an object that was previously and correctly identified as a stop sign, and may further include a natural-language question that requests the human operator to confirm that the object is a stop sign. In this manner, the computing system may keep the human operator alert by having the human operator identify known objects, which may have no effect on the vehicle, since the vehicle already has a correct identification of the objects.

Additionally or alternatively, in other implementations, the alertness data may be associated with at least one portion of the environment data for which no remote assistance data was provided. In other words, the pre-stored data from which the alertness data is based may include objects for which the vehicle did not seek remote assistance, or for which the vehicle otherwise may not have received any identification or instruction from the computing system.

In some implementations, the act of the computing system triggering the display of the alertness data may involve the computing system displaying the alertness data on a user interface of the computing system, such as a GUI on a touchscreen. Alternatively, in other implementations where the computing system is a server, the server may transmit, to a remote computing system, instructions for the remote computing system to display the alertness data, and upon receipt of the instructions, the remote computing system may display the alertness data.

The GUI may include various selectable and non-selectable elements for presenting aspects of the alertness data, such as windows, sub-windows, text boxes, and command buttons. For example, the GUI may include a window for displaying a video teed of an object, and may further include buttons for stopping, starting, fast-forwarding, and rewinding through the video feed. As another example, the GUI may include command buttons, such as those labeled "Yes" and "No," which the human operator can click, touch, or otherwise select. As yet another example, the GUI may include a text box a textual identification of an object. For instance, when viewing pre-stored data including an image of a stop sign, the human operator may use a keyboard to enter the text "stop sign" in a text box that is presented along with the image of the stop sign. Other examples are possible as well. The GUI may also take the form of any GUI described herein, including FIGS. 4D and 4E.

Additionally or alternatively to displaying the alertness data, the alertness data may be provided non-visually, such as by way of a speaker of the computing system. For example, the computing system may enable the human operator to play an audio file when the pre-stored data includes the audio file. For instance, the computing system may display a GUI element that, when selected, plays the audio file. As another example, the computing system may present visual and/or audio pre-stored data, and also play an audio file including a verbal reading of a natural-language question related to the pre-stored data. Other examples are possible as well.

In some implementations, the computing system may include a user interface such as a microphone configured to receive voice commands that are representative of the human operator's response to the alertness data, and the computing system may then process the voice commands to determine the response. For instance, the human operator may view alertness data including (i) a video of the vehicle passing a speed limit sign and (ii) a prompt for the human operator to speak the correct speed limit depicted by the sign and/or speak a command for the vehicle. Accordingly, regardless of whether the vehicle correctly identified the speed limit depicted by speed limit sign, the human operator may speak the correct speed limit into the microphone. Alternatively, if the speed limit is correct, the human operator may speak the word "Correct" or "Yes," and if the speed limit is not correct, the human operator may speak the word "incorrect" or "No," perhaps then followed by speaking the correct speed limit. Other examples are possible as well.

The computing system may provide other ways for the human operator to interact with the alertness data and provide a response. For example, the GUI may enable the human operator to adjust a visual representation of bounding box surrounding the object at issue, such as in scenarios where the vehicle may have incorrectly sized the bounding box.

As another example, the GUI may enable the human operator to select an area of interest in the pre-stored data for further analysis. Such an area of interest may include important objects in the environment that the vehicle did not correctly identify or did not attempt to identify, or may include any object for which the human operator believes their feedback may be desired. As a more specific example, the computing system may display, to the human operator, an image of the pre-stored data that the vehicle may have annotated with the alleged identities of various relevant objects. For instance, the image may include a stop sign, crosswalk, and two pedestrians, but, as a result of the vehicle's object detection, the stop sign, crosswalk, and only one pedestrian may have been correctly identified and annotated in the image as such (e.g., "Stop Sign" text near, or otherwise associated with the stop sign portion of the image, and so forth). In this scenario, the GUI may enable the human operator to select the portion of the image containing the other pedestrian and indicate that the object in that portion of the image is the other pedestrian.

It should be noted that the computing system may also implement similar techniques for interacting with and responding to environment data in the first mode as well.

In some implementations, the act of the computing system receiving a response relating to the alertness data may involve any one or more of the operations discussed above with regard to remote assistance. For instance, the act of the computing system receiving a response relating to the alertness data may involve the computing system receiving, via a user interface such as a touchscreen, keyboard, etc., an input indicating one or more of the following: (i) a correct identification of the object, (ii) that the vehicle identified the object incorrectly (e.g., an incorrect preliminary identification), and (iii) an instruction to control the vehicle. In implementations where the computing system is a server, the act of the computing system receiving a response relating to the alertness data may involve the server receiving the response from another computing system, such as a remote operator computing device. In either implementation, after receiving the response, the computing system may then transmit the response to the vehicle.

In some implementations, the computing system may be configured to support one or more data auditing processes relating to the human operator's responses for remote assistance data (i.e., via the first mode) and/or alertness data (i.e., via the second mode). Through such processes, the computing system and related computing entities may monitor the timing, accuracy, and/or other statistics of the operations of human operators. In addition, through such processes, the computing system and related computing entities may verify whether the stored identifications of various objects are correct, so as to make sure that autonomous vehicles are not using incorrect data. In scenarios where such processes indicate that an object has been misidentified, the computing system or other entity may take action to correct the identification, such as by making the object the subject of another first mode request or second mode alert.

By way of example, the computing system or other entity may maintain, in data storage, various details regarding each remote assistance request and/or presentation of alertness data, including but not limited to: (i) the human operator's response (e.g., a confirmation that the vehicle correctly identified the object and/or an instruction corresponding to the object), (ii) how the vehicle operated in response to the human operator's response, including any consequences of such responsive operation, (iii) the environment data and/or pre-stored data that was the subject of the request or alertness data, (iv) a time stamp of the environment data/pre-stored data, (v) the vehicle's preliminary identification of the object, (vi) the human operator's response time (i.e., how long it took the human operator to respond from the time the human operator received the remote assistance request and/or alertness data), and/or (vii) a history of labeling changes for the object (e.g., if the object's identification was changed, regardless of whether the change was correct), among other possibilities.

As another example, the computing system or other entity may use the records described above to verify whether the objects were correctly identified. Such a verification may be performed by another human operator and/or a more powerful object recognition computing system, for instance. For example, a more powerful computing system may flag records of responses with high response times, such as instances when a human operator took longer than 5 minutes to respond, which may indicate human operator uncertainty of the object's identity. The computing system may then perform additional processing in order to verify the identity of the objects associated with the high-response-time responses.

In some implementations, multiple human operators may receive the same environment data and/or alertness data, and the computing system or other entity may compare the records associated with each human operator, in order to determine human operator accuracy, check for errors or inconsistencies in the responses, etc. For instance, the computing system or other entity may determine that, out of fifty human operators that received the same alertness data regarding verifying the identity of an object, thirty identified the object as a pedestrian, whereas twenty identified the object as a street sign. Upon making such a determination, the computing system or other entity may take further action, such as recording the identification of the object as a pedestrian, or submitting additional requests for remote assistance and/or additional alertness data events in order to acquire additional feedback regarding the object. Other examples are possible as well.

Although some implementations discussed herein describe remote assistance involving environment data, remote assistance data, alertness data, and/or pre-stored data associated with an exterior environment of at least one vehicle, it should be understood that, in other implementations, the first mode and/or the second mode described above may involve environment data, remote assistance data, alertness data, and/or pre-stored data that includes images, sounds, video recordings, and/or other information associated with objects present in an interior environment of at least one vehicle.

For example, as part of the first mode, a remote operator computing system may receive environment data including one or more images captured by a camera within the vehicle, the image(s) including the driver area, front passenger area, and/or backseat area of a vehicle. Further, this environment may represent a vehicle system-estimated number of human occupants within the vehicle, the number having a confidence that is below a threshold. The human operator may then perform various actions, such as confirming that the number of occupants is correct, correcting the number of occupants, and/or providing an instruction to control the vehicle based on the number of occupants. Similar first mode operations may be performed with regard to non-human objects in the interior as well. And in other implementations, similar operations may occur with regard to second mode operations (e.g., confirming a known number of human occupants).

As another example, the vehicle may include a sensor that indicates when a human is operating one or more components of the vehicle (e.g., pedals, steering wheel, etc.) or when the human is sitting in the driver's seat of the vehicle. In this example, in either the first or second mode, the remote assistance human operator may be prompted to confirm whether the human is present in the driver's seat, which component(s) the human is operating, and/or a time stamp of when the human is sitting in the driver's seat and/or operating such component(s). Other examples are possible as well.

Figure 7:
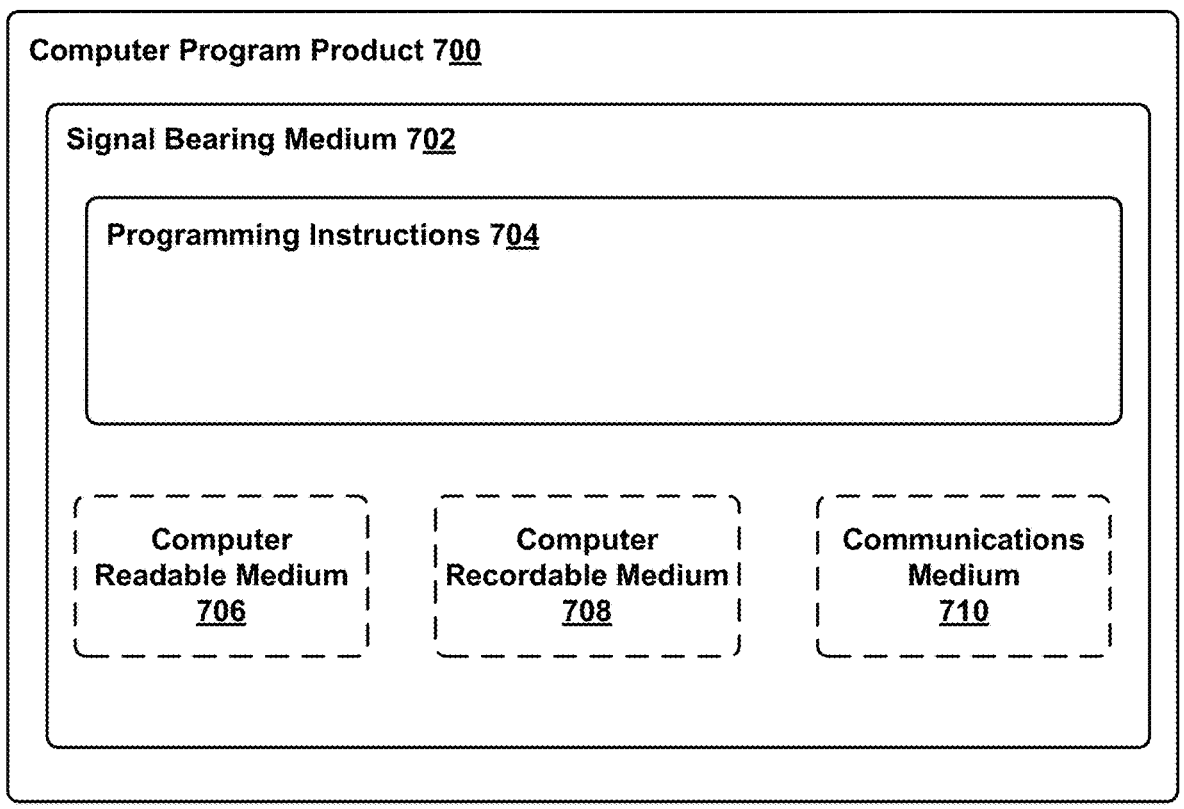
FIG. 7 is a schematic diagram of a computer program, according to an example implementation.

FIG. 7 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 700 is provided using signal bearing medium 702, which may include one or more programming instructions 704 that, when executed by one or more processors may provide functionality or portions of the functionality described above with respect to FIGS. 1-6. In some examples, the signal bearing medium 702 may encompass a non-transitory computer-readable medium 706, such as, but not limited to, a hard disk drive, a Compact Disc (CD), a Digital Versatile Disk (DVD), a digital tape, memory, components to store remotely (e.g., on the cloud) etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Similarly, the signal bearing medium 702 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 or remote computing system 302 and perhaps server computing system 306 of FIG. 3A may be configured to provide various operations, functions, or actions in response to the programming instructions 704 conveyed to the computer system 112 by one or more of the computer readable medium 706, the computer recordable medium 708, and/or the communications medium 710.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method, comprising:
receiving, by a computer system, an input indicating a final destination, wherein the computer system is configured to control a vehicle in an autonomous mode;
determining, by the computer system, that the final destination is not on a pre-approved road for travel by the vehicle in the autonomous mode based on map data representing a plurality of pre-approved roads for vehicles to use when operating in autonomous mode, wherein the vehicle is operable in the autonomous mode only when the vehicle is on one or more pre-approved roads;
selecting, by the computer system, a route from a current location of the vehicle to an intermediary destination based on the map data representing the plurality of pre-approved roads for vehicles to use when operating in autonomous mode, wherein the route only comprises one or more pre-approved roads for travel by the vehicle in the autonomous mode;
navigating, by the computer system, the vehicle in the autonomous mode such that the vehicle traverses the one or more pre-approved roads of the route from the current location to the intermediary destination;
stopping, by the computing system, the vehicle at the intermediary destination;
after stopping the vehicle at the intermediary destination, determining, by the computing system, that a user is able to operate the vehicle; and
responsive to determining that the user is able to operate the vehicle, allowing, by the computing system, the user to drive the vehicle in a manual mode.

2. The method of claim 1, wherein determining, by the computing system, that the user is able to operate the vehicle comprises determining that the user is not impaired.

3. The method of claim 1, wherein determining, by the computing system, that the user is able to operate the vehicle comprises measuring a blood alcohol concentration of the user.

4. The method of claim 1, wherein determining, by the computing system, that the user is able to operate the vehicle comprises:
- causing a problem to appear on a user interface; and
- receiving an answer to the problem via the user interface.

5. The method of claim 1, wherein determining, by the computing system, that the user is able to operate the vehicle comprises measuring a reaction time of the user.

6. The method of claim 1, wherein determining, by the computing system, that the user is able to operate the vehicle comprises administering a test to the user.

7. The method of claim 1, wherein the vehicle is a truck.

8. The method of claim 1, wherein the intermediary destination includes a building.

9. The method of claim 1, wherein allowing, by the computing system, the user to drive the vehicle in a manual mode comprises:
- allowing, by the computing system, the user to drive the vehicle to the final destination.

10. A vehicle, comprising:
- one or more sensors, wherein the one or more sensors are configured to acquire sensor data relating to a current location of the vehicle, wherein the vehicle is configured to operate in an autonomous mode based on information from the one or more sensors; and
- a computer system configured to perform functions:
  - receiving an input indicating a final destination, wherein the computer system is configured to control the vehicle in the autonomous mode;
  - determining that the final destination is not on a pre-approved road for travel by the vehicle in the autonomous mode based on map data representing a plurality of pre-approved roads for vehicles to use when operating in autonomous mode, wherein the vehicle is operable in the autonomous mode only when the vehicle is on one or more pre-approved roads;
  - selecting a route from a current location of the vehicle to an intermediary destination based on the map data representing the plurality of pre-approved roads for vehicles to use when operating in autonomous mode, wherein the route only comprises one or more pre-approved roads for travel by the vehicle in the autonomous mode;
  - navigating the vehicle in the autonomous mode such that the vehicle traverses the one or more pre-approved roads of the route from the current location to the intermediary destination;
  - stopping the vehicle at the intermediary destination;
  - after stopping the vehicle at the intermediary destination, determining that a user is able to operate the vehicle; and
  - responsive to determining that the user is able to operate the vehicle, allowing the user to drive the vehicle in a manual mode.

11. The vehicle of claim 10, wherein determining that the user is able to operate the vehicle comprises determining that the user is not impaired.

12. The vehicle of claim 10, wherein determining that the user is able to operate the vehicle comprises measuring a blood alcohol concentration of the user.

13. The vehicle of claim 10, wherein determining that the user is able to operate the vehicle comprises:
- causing a problem to appear on a user interface; and
- receiving an answer to the problem via the user interface.

14. The vehicle of claim 10, wherein determining that the user is able to operate the vehicle comprises measuring a reaction time of the user.

15. The vehicle of claim 10, wherein determining that the user is able to operate the vehicle comprises administering a test to the user.

16. The vehicle of claim 10, wherein the vehicle is a truck.

17. The vehicle of claim 10, wherein allowing the user to drive the vehicle in a manual mode comprises:
- allowing the user to drive the vehicle to the final destination.

18. A non-transitory computer readable medium having stored therein instructions executable by a computer system to cause the computer system to perform functions, the functions comprising:
- receiving an input indicating a final destination, wherein the computer system is configured to control a vehicle in an autonomous mode;
- determining that the final destination is not on a pre-approved road for travel by the vehicle in the autonomous mode based on map data representing a plurality of pre-approved roads for vehicles to use when operating in autonomous mode, wherein the vehicle is operable in the autonomous mode only when the vehicle is on one or more pre-approved roads;
- selecting a route from a current location of the vehicle to an intermediary destination based on the map data representing the plurality of pre-approved roads for vehicles to use when operating in autonomous mode, wherein the route only comprises one or more pre-approved roads for travel by the vehicle in the autonomous mode;
- navigating the vehicle in the autonomous mode such that the vehicle traverses the one or more pre-approved roads of the route from the current location to the intermediary destination;
- stopping the vehicle at the intermediary destination;
- after stopping the vehicle at the intermediary destination, determining that a user is able to operate the vehicle; and
- responsive to determining that the user is able to operate the vehicle, allowing the user to drive the vehicle in a manual mode.

19. The non-transitory computer readable medium of claim 18, wherein the vehicle is a truck.

20. The non-transitory computer readable medium of claim 18, wherein allowing the user to drive the vehicle in a manual mode comprises:
- allowing the user to drive the vehicle to the final destination.

* * * * *